(12) United States Patent
Nohara et al.

(10) Patent No.: US 7,070,720 B2
(45) Date of Patent: *Jul. 4, 2006

(54) DIE-EXPANDED MOLDING APPARATUS AND METHOD FOR SYNTHETIC RESIN, AND DIE-EXPANDED MOLDED FOAM OBTAINED THEREBY

(75) Inventors: Iwao Nohara, Nakatsugawa (JP); Tomio Nakajima, Nakatsugawa (JP); Kiyotaka Ida, Nakatsugawa (JP); Masahiko Sameshima, Settsu (JP); Yoshiyuki Kobayashi, Nara (JP); Kenji Yamaguchi, Osaka (JP)

(73) Assignees: Daisen Industry Co., Ltd., Nakatsugawa (JP); Kaneka Corporation, Osaka (JP)

( * ) Notice: Subject to any disclaimer, the term of this patent is extended or adjusted under 35 U.S.C. 154(b) by 371 days.

This patent is subject to a terminal disclaimer.

(21) Appl. No.: 10/462,700

(22) Filed: Jun. 17, 2003

(65) Prior Publication Data

US 2003/0209828 A1 Nov. 13, 2003

Related U.S. Application Data

(62) Division of application No. 09/674,343, filed as application No. PCT/JP99/02355 on Apr. 30, 1999, now abandoned.

(30) Foreign Application Priority Data

Apr. 30, 1998 (JP) .................... H10-1998-120166
Jun. 25, 1998 (JP) .................... H10-1998-178743
Jul. 2, 1998 (JP) .................... H10-1998-187514

(51) Int. Cl.
*B29C 44/02* (2006.01)

(52) U.S. Cl. ................. 264/40.3; 264/51; 264/102

(58) Field of Classification Search .......... 264/51, 264/45.4, 40.3, 102
See application file for complete search history.

(56) References Cited

U.S. PATENT DOCUMENTS 3,971,471 A * 7/1976 Ludder .................. 206/519
5,454,703 A   10/1995 Bishop .................. 425/4 R
6,558,592 B1* 5/2003 Nohara et al. .......... 264/51

FOREIGN PATENT DOCUMENTS

| JP | 57-169330 | 10/1982 |
| JP | 60-8026 | 1/1985 |
| JP | 60-51028 | 4/1985 |
| JP | 63-290721 | 11/1988 |
| JP | 3-97529 | 4/1991 |
| JP | 5-92491 | 4/1993 |
| JP | 10-643 | 1/1998 |

* cited by examiner

*Primary Examiner*—Allan R. Kuhns
(74) *Attorney, Agent, or Firm*—Armstrong, Kratz, Quintos, Hanson & Brooks, LLP

(57) ABSTRACT

A die-expanded molding apparatus comprising starting material bead supply for supplying beads on a current of air from a tank through a packer into a cavity formed by a core and cavity molds; a plurality of air expulsion devices having air pressure-adjusting components communicating with the cavity, a dual-system air expulsion device being such that steam chambers on the back side of the core mold and the cavity mold are used as the air pressure-adjusting components, each communicating with the cavity through throughholes formed in the core and cavity molds, respectively; an air expulsion device having one or more air pressure-adjusting components communicating with a clearance between the core and cavity molds; and a control for controlling the air pressure in each of the air pressure-adjusting components to be pressurized less than the pressure in the tank.

17 Claims, 12 Drawing Sheets

(a)

(b)

(c)

LINE: PRIOR ART

DIE-EXPANDED MOLDING APPARATUS AND METHOD FOR SYNTHETIC RESIN, AND DIE-EXPANDED MOLDED FOAM OBTAINED THEREBY

CROSS REFERENCE TO RELATED APPLICATION

This application is a division of Ser. No. 09/674,343, filed Oct. 30, 2000, which is a 371 application of PCT Appln. No. PCT/JP99/02355, filed Apr. 30, 1999 now abandoned.

BACKGROUND OF THE INVENTION

1. Field of the Invention

The present invention relates to a die-expanded molding apparatus and method for synthetic resins, as well as die-expanded molded foam obtained thereby, and more particularly to a technique for improving the packing density of starting material beads in cavities to obtain molded products with more uniform packing density.

2. Description of the Related Art

As shown in FIG. 13, a die-expanded molding apparatus for forming molded products using starting material beads consisting of a thermoplastic synthetic resin comprises a pair of mutually opposed forming molds 100 and 101, and a packer 111 for packing starting material beads in a cavity 104 formed by the two forming molds 100 and 101, where chambers 102 and 103 are formed on the back side of the two forming molds 100 and 101, respectively, several vent holes 105 and 106 communicating between the cavity 104 and the chambers 102 and 103 are formed in the two chambers 100 and 101, respectively, and a service fluid such as steam, air, or cooling water needed for molding is fed to the chambers 102 and 103. In this case, upper service ports 107 and 108 are provided in the tops of chambers 102 and 103, respectively, to supply heated steam, and bottom service ports 109 and 110 connected to a vacuum pump or drain pipe are provided in the bottoms to supply steam to the cavity 104.

The several vent holes 105 and 106 penetrating through the forming molds 100 and 101 are actually provided when core vents, which consist of cylinders having lids with an outside diameter of 7 to 12 mm perforated by vent holes consisting of round holes of about 0.5 mm ø or slits of about 0.5 mm width, are fitted into core vent attachment holes arranged at a pitch of 20 to 50 mm in the forming molds 100 and 101.

When expanded foam is molded using such an expansion molding apparatus, the forming molds are first closed to form the cavity 104, pre-expanded starting material beads of polystyrene or the like are transported from a starting material tank (not shown) through the packer 111 into the cavity 104 and packed there, the starting material beads in the cavity 104 are then heated with hot steam, they are expanded and fused and are then cooled to solidification, and the forming molds 100 and 101 are opened to allow the expanded molded foam to be taken out.

One problem in particular which needs to be remedied in such a molding method, however, is the considerable difference between the packing density of the starting material beads at specific locations in the cavity 104 and the packing density at other locations. These specific locations can be broadly divided into (1) the interior of the cavity 104 where the detailed portions of molded products having complex shapes are formed, (2) the outer peripheral distal portion 104a of the cavity 104, and (3) the parts facing the packer 111 in the cavity 104.

Causes of this variation in packing density are described in detail in sections (1) through (3) below, but before that, the most commonly used method for packing starting material beads will be briefly described.

((1)) Cracked packing, ((2)) pressure packing, ((3)) compression packing, and the like are widely used methods for packing starting material beads.

(1) Cracked packing is employed when the air used during packing cannot be adequately expelled from the core vents alone, which are arranged in the core mold and cavity mold; during packing, the core mold and cavity mold are not completely closed, but are left open (are cracked) to an extent equal to about 10% of the floor thickness of the molded product, for example, to let the air used during packing to escape from the gap between the core mold and cavity mold.

(2) In pressure packing, the interior of the starting material tank holding the starting material beads is pressurized to between about 0.2 and 1.5 kg/cm$^2$, while the cavity is left open to atmospheric pressure through the core vents and chambers, in which state the starting material beads are delivered into the cavity and packed there by means of the pressure differential between the starting material tank and the cavity.

(3) In compression packing, the pressure p in the starting material tank is pressurized to about 1.0 to 5.0 kg/cm$^2$, which is higher than that in pressure packing, the interior of one chamber is pressurized, and the pressure differential (p−p1) of the pressure p1 in the cavity communicating through the vent holes is varied, so as to deliver and pack the starting material beads.

Causes of the variation in packing density are described below.

(1) Interior of Cavity for Forming Detailed Portions of Molded Products Having Complex Shapes In the three aforementioned packing methods, suitable pressure differential is ultimately applied between the starting material tank and the cavity, and the starting material beads are delivered by the current of air produced on the basis of this pressure differential. In the cavity 104 having the relatively simple shape illustrated as an example in FIG. 13, the starting material beads are fully packed throughout, resulting in a shape with few local packing irregularities, so that a final expanded molded foam can be obtained with relatively uniform quality and few packing irregularities.

However, the results are different in the case of shapes with deep, narrow recesses 112 having a pouch-shaped cross section in the center plane of the core mold 101 such as that shown in FIG. 14(a) (in two locations above and below in FIG. 14) and in the case of shapes with deep, narrow recesses 112 having a pouch-shaped cross section in the center plane of the cavity mold 100 such as that shown in FIG. 14(a) (similarly in two locations above and below in FIG. 14). In these two cases, the current of air acting as the advancing force for packing the starting material beads settles in these portions, which makes it difficult for the starting material beads to be packed all the way into the interior of the recesses 112 or 113 having a pouch-shaped cross section and results in drawbacks such as extremely uneven packing or, in the worst cases, unsuccessful molding due to packing defects.

Efforts have been made to arrange special packers for recesses that are difficult to pack in order to remedy such problems, but they have resulted in the inconvenience of increasing the amount of air that is used, or in the need to reduce the number of molded foam articles which can be formed per mold, with the problem of considerably lowered productivity. That is because the number of packers that can be attached per molding apparatus is usually limited to a certain extent because of the volume of the starting material tank, the supply capacity of the pressurized air, and the like. 18 packers are attached in the most common apparatus, for example, with 3 packers set up per cavity when the molded product has a simple shape, whereas when 6 are needed for molded products having a more complex shape, even though there is room for 6 molded foam articles, only 3 can be molded, cutting productivity in half.

In addition, the increase in the amount of air supplied to the cavity per unit time when the number of packers is increased results in a sudden drop in the air pressure in the cavity immediately after packing and the like, and slows down the expulsion of air from the cavity, and the like, causing all the more variation in packing density. The number of packers used and the arrangement of the packers are thus a concern for designers of molds, and a great many elements require trial and error, making standardization extremely difficult to achieve in this field. The packing density tends to be lower particularly in parts that are some distance from the packer or in narrow, bottomed parts such as the recesses described above and the like, and it is necessary to increase the overall packing density in order to ensure a suitable packing density in such parts which are difficult to pack, resulting in a heavier molded foam than when the density is uniform.

Additionally, in terms of molding, it is necessary to further expand the starting material beads, and to increase the hot steam pressure, so that the starting material beads are thoroughly fused in parts with low packing density when the packed starting material beads are heated with steam. However, when the hot steam pressure is increased in parts with such low packing density, the parts with a high packing density become overheated, resulting in expansion pressure which is higher than that during normal molding. Thus, when the molded product is cooled, a longer time is needed to reduce the high expansion pressure to an expansion pressure allowing the molded product to be removed from the mold, and the longer molding cycle leads to a drop in productivity. Furthermore, the uneven expansion pressure in the various parts of the molded product during heating or cooling results in poor mold releasability and poor packing properties, and thus in the problems of lower productivity and yields.

(2) Outer Peripheral Distal End of Cavity

In pressure packing and compression packing, as shown in FIG. 13, the outer peripheral distal end 104a of the cavity 104 forms a dead end because the starting material beads are packed into the cavity 104 while the two molds 100 and 101 are completely closed. The current of air produced by the pressure differential between the starting material tank (not shown) and the cavity 104 thus settles in the outer peripheral distal end 104a, making it difficult to pack the starting material beads and tending to result in irregular density.

In cracked packing, on the other hand, the core mold and cavity mold are not completely closed, and are left open to an extent equal to about 10% of the floor thickness of the molded product, for example, so the outer peripheral distal end of the cavity does not form a dead end, but since the core mold and cavity mold are closed after being packed, the density in the floor portion of the molded product is higher than that in other portions to an extent corresponding to the cracked gap, resulting in a separate problem of irregular density.

Additionally, when the two molds are completely closed after being packed with the starting material beads in cracked packing, the outer peripheral distal end of the cavity forms a dead end, resulting in the following problems when the starting material beads are heated by steam and cooled by cooling water to remove the molded product from the mold.

When the starting material beads are heated, hot steam is supplied from one chamber to another, for example, allowing the hot steam to pass through the starting material beads in the cavity, but, as shown in FIG. 13, when the outer peripheral distal end 104a of the cavity forms a dead end, it becomes difficult for the hot steam to reach the outer peripheral distal ends 104a, and heat flows into the outer peripheral parts 100a and 101a of the mold where the heat volume is relatively high, making it difficult for the temperature of the starting material beads in the outer peripheral distal ends 104a to increase, with a correspondingly slower increase in temperature than in other parts, so that the heating process takes a longer time, resulting in the problem of a longer overall molding time.

When the molded product is cooled, cooling water is sprayed onto the molds 100 and 101 from nozzles (not shown) disposed in the chambers 102 and 103, the pressure in the chambers 102 and 103 is reduced to allow the water adhering to the molds or moisture in the cavity 104 to evaporate, and the expanded molded foam is cooled off along with the molds by the vaporization heat at that time, but now, in contrast to the heating time of the starting material beads described earlier, the outer peripheral distal end 104a of the cavity 104 becomes difficult to cool as a result of heat conduction from the outer peripheral portions 100a and 101a of the molds, and the time needed to sufficiently cool the parts of the expanded molded foam located at the outer peripheral distal end 104a of the cavity 104 is a problem.

When the molded product is released from the mold, the expanded molded foam is pushed out by an ejector pin (not shown) from the back side of the cavity mold 100 while the molds 100 and 101 are open, allowing the expanded molded foam to be taken out of the mold, but a problem that occurs when the core mold 101 is opened is that water which has collected in the inter-mold cavity 116 along the seams of the molding apparatus around the frames 114 and 115 and the outer peripheral portions 100a and 101a of the molds flows out, wetting the expanded molded foam which is the final product.

(3) Parts of the Cavity Facing the Packer

Although the packing density of the starting material beads in this part is high, conventional packing methods will be discussed in further detail before the relevant mechanism is discussed.

In the three packing methods noted above, the starting material beads in the packer 111 are returned to the starting material tank at the end of the packing operations, and a step referred to as blow back takes place, where the distal end of the packer 111 is closed.

Blow back is described with reference to FIG. 15. First, the packer 111 is composed of a packing pipe component 120, through which the starting material beads pass, and a flange 121. The tip is connected through a tube 102 to a supply hole 122 in the cavity mold 100. A packing tube 124 is connected between a starting material tank 123 and the packer 111, allowing the starting material beads to be delivered into the cavity 103 between the two molds.

When the pressure in the cavity 103 is adjusted to a negative pressure relative to the pressure in the starting material tank 123 with this arrangement, the starting material beads are delivered from the starting material tank 123 through the packing pipe 124 and the packing pipe component 120 of the packer 111 into the cavity 104 by the pressure differential, as shown in FIG. 15(a). In this case, pressurized packing air is introduced from the packing air valve 125 and is sprayed out from a spraying hole 126 in the distal end of the packing pipe component 120 as indicated by the arrows in FIG. 15(a) in order to urge the starting material beads in such a way that the delivered starting material beads smoothly enter the cavity 104 and are tightly packed there.

When the cavity 104 is thus filled with the delivered starting material beads, for example, in the manner depicted in FIG. 15(b), the packing air introduced from the packing air valve 125 is blocked by the tightly packed starting material beads and turns around in a U-turn from the spraying hole 126, resulting in a back flow through the packing pipe component 120. Due to this current of air, the starting material beads in the packing pipe component 120 are pushed back toward the packing pipe 124, leaving the component empty. This step in the blow back process is normally referred to as the natural blow back process.

The starting material beads in the packing pipe component 120 are ejected by the natural blow back, a plunger shaft 127 housed in the flange 121 is then pushed out, and the plunger tip 128 is pushed out, as shown in FIG. 15(c), so that the starting material bead supply hole 122 of the cavity mold 100 is closed off. The starting material beads are thus packed in a sealed state in the cavity 104. The starting material beads remaining in the packing pipe 124 are also blown back and are all returned to the starting material tank 123, ending the packing process.

In any type of conventional packing method, however, the parts of the expanded molded foam corresponding to the location of the aforementioned starting material bead supply hole 122 are subject to the phenomenon of over-packing, resulting in the problems of molded products with defective shapes and defective appearance.

The phenomenon of over-packing occurs because the starting material beads which are sent through the packing pipe component 120 of the packer 111 into the cavity 104 during natural blow back are believed to adhere to the cavity 104 side of the supply hole 122, as shown in FIG. 15(b), and the excess starting material beads collect into a protruding shape on the packer 111 side, but lumps of the excess starting material beads are pushed into the packed starting material beads by the plunger tip 128, as shown in FIG. 15(c), when the supply hole 122 is sealed off, presumably causing an abnormal increase in the density in that portion.

Although measures have been attempted to prevent the build up of lumps of excess starting material beads by adjusting the pressure, spraying angle, time, and the like of the packing air sprayed from the spraying hole 126 in order to prevent such over-packing, further problems that have resulted include a longer blow back treatment time, greater consumption of packing air, and the like, yet the effects on over-packing have still been unsatisfactory, and the problem remains to be solved.

An object of the present invention is to provide a die-expanded molding apparatus and method for synthetic resins allowing the packing density of the starting material beads in the aforementioned areas to be uniformly adjusted, as well as the die-expanded molded foam obtained thereby.

SUMMARY OF THE INVENTION

1. Die-Expanded Molding Apparatus

The die-expanded molding apparatus pertaining to the present invention comprises starting material bead supply means for supplying starting material beads consisting of a thermoplastic synthetic resin on a current of air from a starting material tank through a packer into a cavity formed by a core mold and cavity mold; at least dual-system air expulsion means having pressure-adjustable air pressure-adjusting components communicating with the aforementioned cavity, for allowing the air used to supply the starting material beads into the cavity to be expelled from the cavity by means of the pressure differential between the cavity and the air pressure-adjusting components, the at least dual-system air expulsion means being such that a steam chamber on the back side of the core mold and a steam chamber on the back side of the cavity mold are used as the air pressure-adjusting components, each communicating with the cavity through through-holes formed in the core mold and cavity mold, respectively; and control means for independently controlling the air pressure in each of the air pressure-adjusting components of the at least dual-system air expulsion means.

In this molding apparatus, while the starting material beads are supplied on a current of air into the cavity by the starting material bead supply means, the air supplied into the cavity is expelled from the cavity by the air expulsion means, allowing the starting material beads to be packed in the cavity, but since the air expulsion means has at least two systems, which are independently controlled, the starting material beads can be packed in areas, for example, where the packing density tends to be lower, allowing the packing density in various parts of the molded product to be regularized, the starting material beads can be packed first in areas where greater strength and rigidity are desired, allowing the packing density to be locally increased in those areas, and the packing density in various parts of the molded product can be adjusted to suitable levels without increasing the number of packers, even in molded products which have parts where the packing density tends to be lower, such as thin-walled parts.

Air expulsion means having the following structure can also be provided in addition to the aforementioned dual-system air expulsion means, allowing the air pressure in the air pressure-adjusting components in the plurality of air expulsion means to be controlled, independently or in any combination, by the control means.

(1) Air expulsion means having one or a plurality of air pressure-components in communication with the clearance between the core mold and cavity mold may be provided. In this case, the air supplied into the cavity can be effectively expelled to the outside from the clearance formed at the outer periphery of the cavity. Thus, when making a container or the like with a deep bottom, for example, clearance can be formed at a location corresponding to the open edge of the container, allowing a suitable packing density to be maintained without increasing the number of packers, and the quality of the container to be improved.

(2) Air expulsion means having one or a plurality of air pressure-components in communication with the interior of narrow, bottomed parts that are difficult to pack with the starting material beads may be provided, and the air pressure in the air pressure-adjusting components in the plurality of air expulsion means may be controlled, independently or in any combination, by the control means in such a way that the starting material beads are packed first in the parts that are difficult to pack. Such a structure allows molded products of good quality to be produced because the density of the starting material beads can be maintained in parts that are difficult to pack, even in molded products with a complex shape having parts that are difficult to pack, which have been difficult to produce conventionally because the packing density could not be sufficiently ensured.

(3) Air expulsion means having one or a plurality of air pressure-adjusting components in communication with the interior of remote parts at a distance from the starting material bead supply means may be provided, and the air pressure in the air pressure-adjusting components in the plurality of air expulsion means may be controlled, independently or in any combination, by the control means in such a way that the starting material beads are packed first in the parts that are difficult to pack. Such a structure allows molded products of good quality to be produced because the density of the starting material beads can be maintained in parts that are difficult to pack, even in molded products with a complex shape having parts that are difficult to pack, which has been difficult to achieve conventionally because of the inability to ensure sufficient packing density.

The aforementioned molding apparatus may also be provided with plural-system air expulsion means in which the chambers on the back side of the core mold and/or the back side of the cavity mold are used as air pressure-adjusting components. In this case, the packing density in various parts of the molded product is controlled more precisely to increase the packing density in the necessary parts and ensure suitable packing density in the molded product as a whole.

Preferably, atmospheric release, pressurization, reduced pressure, and/or these are combined and the internal pressure of the air pressure-adjusting components is controlled by the control means so that the packing density of the starting material beads can be suitable determined in various parts of the cavity.

2. First Die-Expanded Molding Method: Improved Packing Properties in Outer Periphery of Cavity This first die-expanded molding method is a die-expanded molding method for synthetic resins in which starting material beads are packed into a cavity formed by a core mold and cavity mold, the material is heated, expanded, and fused to form molded products, and the product is cooled and released from the mold, wherein various service fluids for the supply of steam to the cavity, pressurization and depressurization, the supply of compression air, and the like are manipulated by using the inter-mold clearance, formed in such a way as to communicate with external service piping, at the seam of the core mold and cavity mold located at the circumference of the cavity when the two molds are closed.

Specifically, the method should comprise at least one of the following operations to make more effective use of the clearance between the core mold and cavity mold.

1) Expelling the packing air through the clearance when the starting material beads are being packed: This operation allows the air to be expelled from the outer peripheral distal end of the cavity in conjunction with the expulsion of air from the core vents of the two molds, so that the starting material beads can cross sufficiently to the outer peripheral distal end of the cavity without the molds being cracked, and irregular packing density can be prevented. The advantage of improving the packing properties of the starting material beads can also be obtained even when the molded product is a deep container and when the distal end has a complex shape.

2) Adjusting the pressure in the cavity through the clearance when the starting material beads are being packed: With this structure, the back pressure can be adjusted to the desired pressure relative to the pressure of the packing air for sending the starting material beads from the starting material tank, so that the optimal packing method can be used, such as pressure packing, compression packing, and vacuum or suction packing in which the back pressure is adjusted to atmospheric pressure or lower.

3) Introducing steam into the clearance to heat the portions around the clearance and into the cavity to facilitate the heating of the starting material beads in the portions around the cavity when the packed starting material beads are being heated: This affords the advantage of allowing a shorter molding time to be designed because the starting material beads in the outer peripheral distal end of the cavity can be more rapidly heated, since the flanges constituting the outer periphery of the two molds, which in the past required a relatively large volume of heat and were difficult to heat, are directly heated. Since it is possible to ensure that the air is purged from the outer peripheral distal end by steam and to independently adjust the pressure through the clearance, the steam pressure can be controlled to a positive or negative setting or the like relative to the chamber pressure so as to set the temperature balance in the molds to optimum conditions, allowing dramatic reductions in the cycle time and energy conservation to be anticipated.

4) Reducing the pressure in the cavity through the clearance to promote cooling by the vaporization of moisture during cooling: In this case also, the cycle time can be dramatically reduced because of the ability to promote decreases in temperatures in the flanges of the molds, which require large volumes of heat and are difficult to cool.

5) Expelling drainage from the clearance during mold release operations to remove the expanded molded foam: Because drainage collecting in the clearance and in the inter-mold cavity as a result of water injection during cooling can be eliminated in this case, it is possible to remedy drawbacks such as wetting of the working area, even when the molds are opened to release the product.

3. Second Die-Expanded Molding Method: Improved Packing Properties in Parts That Are Difficult to Pack The second die-expanded molding method is a die-expanded molding method for synthetic resins in which starting material beads are packed into a cavity formed by a core mold and cavity mold, the material is heated, expanded, and fused to form a molded product, and the molded product is cooled and released from the mold, wherein at least the chamber on the back side of the mold side, where narrow, bottomed portions that are difficult to pack with the starting material beads are formed, is held at a negative pressure relative to the atmospheric pressure of the starting material beads packed into the cavity by the packer, and part of the predetermined packing amount of the starting material beads is delivered and packed in a concentrated manner in the difficult-to-pack portions, while the remainder of the predetermined packing amount is then delivered to pack all of the starting material beads in the cavity.

In the second die-expanded molding method, the starting material beads can be packed in a concentrated manner in parts that are difficult to pack, making it possible to prevent local drops in the packing density of the starting material beads in such parts that are difficult to pack.

Examples of parts that are difficult to pack include pouch-shaped recesses formed in at least one of either the core mold or cavity mold. The current of packing air tends to settle in such pouch-shaped recesses, and the packing density of the starting material beads decreases, so such drops in the packing density can be prevented by packing the starting material beads in a concentrated manner in such parts which are difficult to pack.

The starting material beads can also be repeatedly packed in parts that are difficult to pack, so that the starting material beads are packed in a concentrated manner in such parts that are difficult to pack.

4. Third Die-Expanded Molding Method: Improved Packing Properties in Parts That Are Difficult to Pack The third die-expanded molding method is a die-expanded molding method for synthetic resins in which the aforementioned die-expanded molding apparatus is used to pack starting material beads in a cavity formed by a core mold and a cavity mold, the material is heated, expanded, and fused to form a molded product, and the molded product is cooled and released from the mold, wherein starting material beads consisting of a thermoplastic synthetic resin are supplied on a current of air from a starting material tank through a packer into the cavity formed by the core mold and cavity mold by starting material bead supply means when the starting material beads are packed into the cavity; and the starting material beads are packed while the current of air in the cavity is controlled by adjusting the air pressure, independently or in any combination, in a plural-system air expulsion means by automatic control by control means.

In this die-expanded molding method, the air expulsion means having air pressure-adjusting components in communication with parts that are difficult to pack, for example, among the dual-system air expulsion means, is first controlled to first pack the starting material beads in those parts, so as to ensure that a suitable packing density is maintained in those parts.

The following are methods for controlling the air expulsion means by the aforementioned control means.

(1) The air expulsion means is controlled in such a way that the starting material beads are packed first in the narrow, bottomed portions where the starting material beads are difficult to pack. In this case, molded products of good quality can be produced because the packing density of the starting material beads in the parts that are difficult to pack can be maintained at a suitable packing density, even in molded products having a complex shape such as parts which are difficult to pack and which have been considered difficult to manufacture.

(2) The air expulsion means is controlled such a way that the starting material beads are packed first in remote portions at a distance from the starting material bead supply means. In this case, molded products of good quality can be produced be maintaining a suitable packing density in remote parts where the packing density of the starting material beads tends to be lower.

A desirable method for improving the packing properties in parts where the starting material beads are difficult to pack is to pack the starting material beads in the cavity as the amount of starting material beads packed per unit time in the cavity is adjusted by the adjusting means.

When the starting material beads are supplied to the cavity on a current of packing air as the amount in which they are supplied per unit time is adjusted by the adjusting means, the starting material beads can be more efficiently supplied to parts that are difficult to pack, such as narrow, bottomed, thin wall parts that are difficult to pack with starting material beads or remote parts that are at a distance from the packer. In other words, when the amount in which the starting material beads are supplied per unit time is adjusted, there is less contact between the starting material beads and fewer collisions during packing, and the flow of air is not hampered by the starting material beads themselves, so the starting material beads can be smoothly packed in parts that are difficult to pack.

As such an adjusting means, a supply means such as a screw conveyor may be provided to supply the starting material beads while the amount in which they are supplied per unit time is adjusted by this supply means, but since the starting material beads might be damaged or the cost of the molding apparatus might be higher, it is desirable to provide adjusting means for adjusting the amount in which the starting material beads are supplied per unit time on a current of air for packing the cavity by diluting the starting material beads with adjusting air, allowing the starting material beads to be supplied while diluted with adjusting air.

In regard to the specific numerical value of the degree to which the starting material beads are diluted by the aforementioned adjusting means, the final degree of dilution is defined as the numerical value obtained by dividing the volume of air supplied to the cavity during packing by the volume of the starting material beads, and the final degree of dilution is 5 or more, preferably between 10 and 50. In other words, a final degree of starting material bead dilution of less than 5 results in a lower starting material bead packing density in parts that are difficult to pack, so the value should be set to 5 or more.

5. Blow Back: Improved Packing Properties in Locations Facing the Packer

The following blow back operations should be carried out immediately before the conclusion of starting material bead packing in the cavity in the aforementioned die-expanded molding methods.

(1) The pressure in the cavity is set to a negative pressure relative to the internal pressure of the starting material tank holding the starting material beads, so as to allow the starting material beads from the starting material tank to be packed into the cavity when the starting material beads are being packed, and the pressure in the cavity is adjusted to a positive pressure as the pressure in the starting material tank is maintained during blow back operations immediately prior to the conclusion of the packing. With this structure, a current of air from the cavity to the starting material tank is produced during blow back, and the surplus starting material beads in the packer are allowed to adhere to the cavity side, thereby preventing defects in the return flow of the starting material beads, and making it possible to prevent local increases in the packing density caused by such defects in the return flow.

(2) The pressure in the cavity is set to a negative pressure relative to the internal pressure of the starting material tank holding the starting material beads, so as to allow the starting material beads from the starting material tank to be packed into the cavity when the starting material beads are being packed, and the pressure in the starting material tank is adjusted to a pressure equivalent to or lower than the pressure in the cavity as the pressure in the starting material tank is maintained during blow back operations immediately prior to the conclusion of the packing. This also makes it possible to prevent local increases in the packing density caused by defects in the return flow in the same manner as in section (1).

(3) Natural blow back is carried out at an adjusted pressure as described in sections (1) and (2) during blow back operations immediately prior to the conclusion of the packing, the starting material supply holes are subsequently closed off by a plunger, and the forced blow back is then carried out. This ensures that the starting material beads in the packer flow back into the starting material tank.

6. Die-Expanded Molded Foam

The density in various parts of the die-expanded molded foam pertaining to the present invention is adjusted to within ±5% of the mean density, preferably within ±4%, more preferably within ±3%. Such a molded product was considered difficult to form in the past, but can be produced according to the aforementioned die-expanded molding methods. The time of the heating and cooling cycles during molding can be shortened, and thin-walled parts and the like with satisfactory strength and rigidity can be ensured, while lighter molded products can be produced.

Examples of specific structures for molded products in which it would be desirable to thus set the density in various parts of molded products to within ±5% of the mean density include those in which the degree of shape complexity is 1.1 or more, where the degree of shape complexity is defined as the numerical value obtained by dividing the surface area of the molded product by the volume, which is measured by cm unit; those in which the wall thickness of the thin-walled portions of the molded product is 10 mm to 3 mm; and those in which 3 or less beads are disposed in the thicknesswise direction of the thin-walled portions of the molded product.

BRIEF DESCRIPTION OF THE DRAWINGS

FIG. 13 is a vertical cross sectional view of a die-expanded molding apparatus;

FIG. 14 is a vertical cross sectional view of a die-expanded molding apparatus with another structure; and FIG. 15 is an illustration of a starting material bead packing system.

DETAILED DESCRIPTION OF THE PREFERRED EMBODIMENTS

Preferred embodiments of the present invention are described below with reference to the drawings.

Die-Expanded Molding Apparatus

Figure 1:
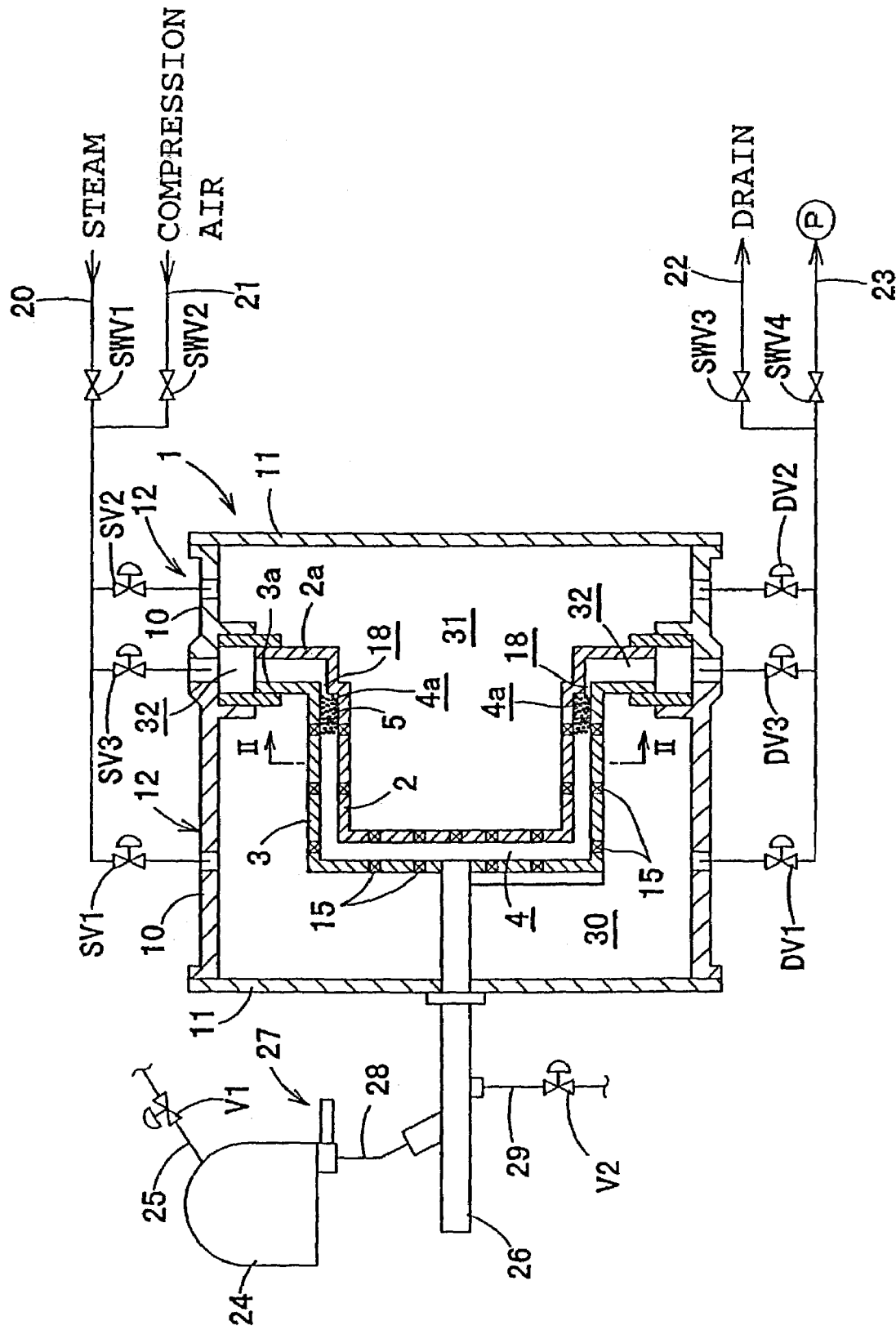
FIG. 1 is a vertical cross sectional view of a die-expanded molding apparatus.
Figure 2:
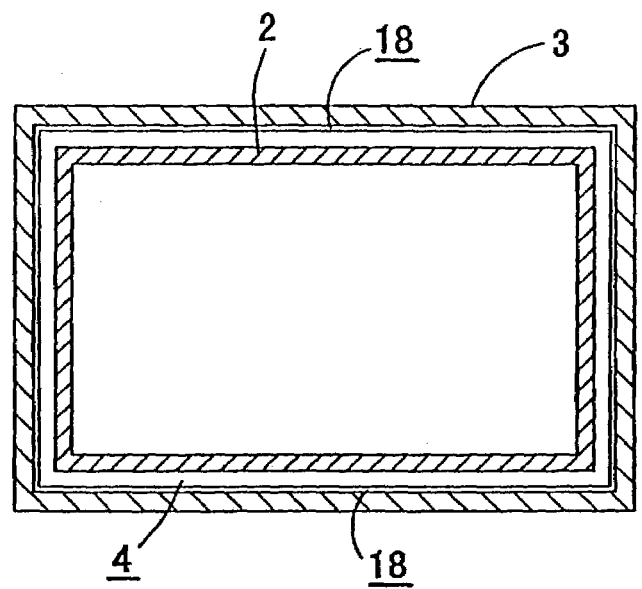
FIG. 2 is a cross sectional view of line 11—11 in FIG. 1.

As shown in FIGS. 1 and 2, the die-expanded molding apparatus 1 comprises a mutually opposed core mold 2 and cavity mold 3, bead packing means for packing starting material beads 5 in a cavity 4 formed by the core mold 2 and cavity mold 3, steam supply means for allowing the starting material beads 5 packed in the cavity 4 to be heated, expanded, and fused by steam, and cooling means for cooling the molded product.

The core mold 2 and cavity mold 3 are attached to a housing 12 with a frame 10 and back boards 11, and chambers 30 and 31 are formed on the back side of the cavity mold 3 and core mold 2, respectively.

Figure 3:
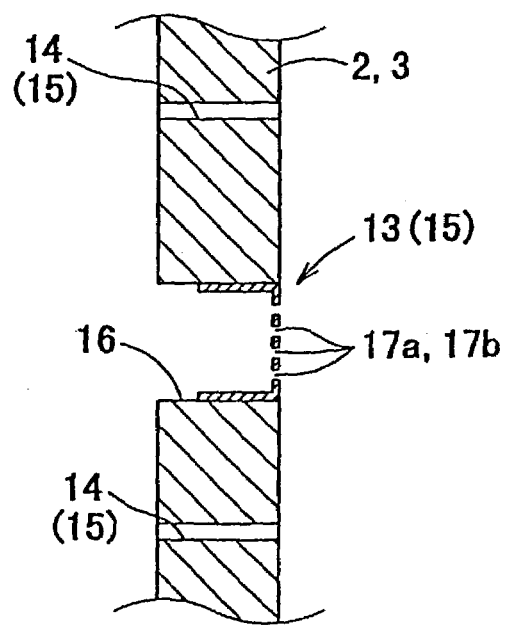
FIG. 3 is a vertical cross sectional view of the area around the through-holes.
Figure 4:
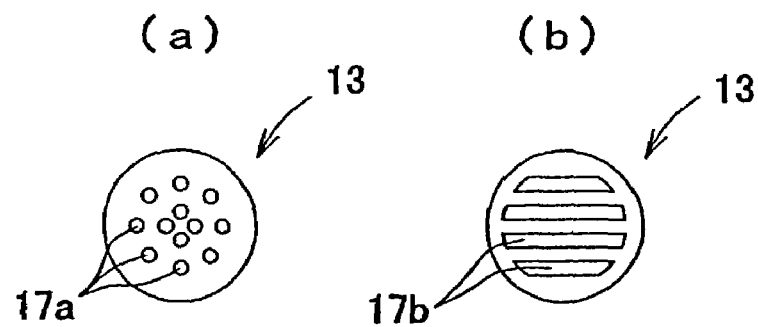
FIG. 4 is a front view of a core vent.

As shown in FIGS. 1 and 3, through-holes 15 consisting of core vents 13 and core vent holes 14 are formed in the core mold 2 and cavity mold 3, and the chambers 30 and 31 communicate with the cavity 4 through the through-holes 15. As shown in FIGS. 3 and 4, the core vents 13 are members fitted into attachment holes 16 formed in the core mold 2 and cavity mold 3, and are bottomed cylinders in which a plurality of round through-holes 17a of smaller diameter than that of the starting material beads 5 or longitudinal holes 17b are formed in the bottom surface. As shown in FIG. 3, the core vent holes 14 are formed in the core mold 2 and cavity mold 3, and are through-holes of smaller diameter than that of the starting material beads 5.

Figure 5:
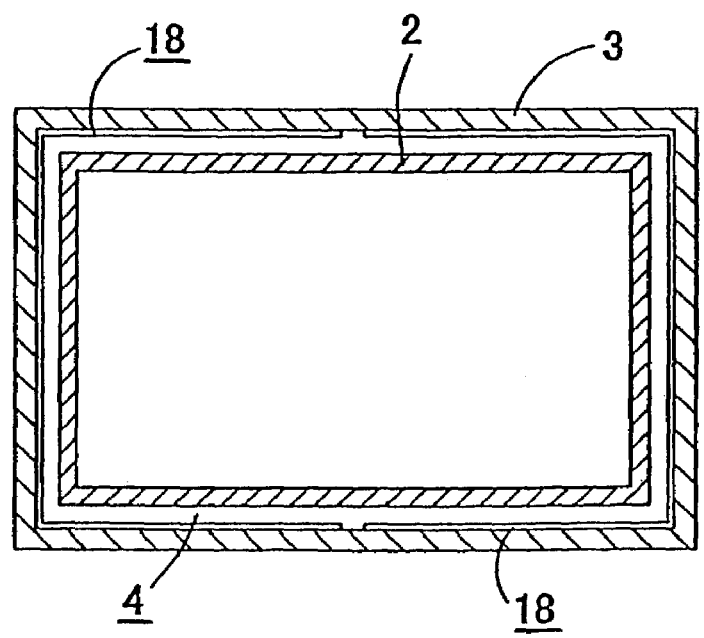
FIG. 5 corresponds to FIG. 2 of another die-expanded molding apparatus.

Flanges 2a and 3a are formed on the outer periphery of the core mold 2 and cavity mold 3, and an inter-mold cavity 32 communicating with the cavity 4 through the clearance 18 between the core mold 2 and cavity mold 3 while the mold is closed is formed between the flanges 2a and 3a. The clearance 18 between the core mold 2 and the cavity mold 3 is smaller than the diameter of the starting material beads 5, to let only the air supplied to the cavity 4 along with the starting material beads 5 to pass through when the starting material beads 5 are packed, so that the starting material beads 5 stays in the cavity 4. The clearance 18 may be formed along the entire periphery of the core mold 2 and cavity mold 3, or it may be formed locally in just the necessary portions. As shown in FIG. 5, moreover, the clearance 18 may be plurally divided (into two in the figure), and a plurality of inter-mold cavities 32 may be provided corresponding to the plurality of clearances 18.

The chambers 30 and 31 and the inter-mold cavity 32 are connected through service valves SV1, SV2, and SV3 and service switching valves SWV1 and SWV2 to a steam supply pipe 20 and air supply pipe 21, respectively, and are also connected through drain valves DV1, DV2, and DV3 and switching valves SWV3 and SWV4 to a drain pipe 22 and a vacuum pipe 23 equipped with a vacuum pump P, respectively. Service fluids such as steam or vacuum air can be individually supplied to or expelled from the chambers 30 and 31 and the inter-mold cavity 32 by the operation of the utility valves SV1 through SV3, the drain valves DV1 through DV3, and the switching valves SWV1 and SWV2. Also, when the clearance 18 and inter-mold cavities 32 are plurally divided as described above, the service fluids may be individually supplied to and expelled from the respective inter-mold cavities.

The bead packing means is described below. As shown in FIG. 1, a starting material tank 24 is provided for storing the starting material beads 5. A suction pipe 25 is connected to the starting material tank 24, and the suction pipe 25 is equipped with a suction valve V1, this suction valve V1 being controlled to adjust the internal pressure of the starting material tank 24.

A packer 26 which opens into the cavity 4 is attached to the back plate 11 on the cavity mold 3 side, a shutter 27 is attached to the starting material tank 24, the packer 26 is connected through a packing pipe 28 to the starting material tank 24, and the starting material beads 5 in the starting material tank 24 are supplied on an air current from the packer 26 into the cavity 4. A packing air supply pipe 29 is connected to the packer 26, and packing air of suitable pressure is supplied by a packing air valve V2 mounted in the packing air supply pipe 29. The internal pressure of the starting material tank 24 may thus be set to atmospheric pressure, reduced pressure, or increased pressure when it is set to or above the internal pressure of the chambers 30 and 31 and the inter-mold cavity 32.

A material with physical properties suited to the conditions of use or the like of the molded product that is to be prepared should be selected as the material for the starting material beads 5. Polystyrene-based synthetic resin materials, polyolefin-based synthetic resin materials such as polyethylene or polypropylene, or copolymers and the like of such synthetic resin materials can be used.

The degree of expansion of the starting material beads 5 depends on the material of the starting material beads 5, but a range of 3 to 150 times is preferred. Specifically, starting material beads consisting of a polystyrene-based synthetic resin material should be expanded 3 to 100-fold, and preferably 3 to 80-fold, while starting material beads consisting of a polyolefin-based synthetic resin material should be expanded 3 to 90-fold, and preferably 3 to 60-fold. A particle diameter in the range of between 1 and 10 mm can be used. Starting material beads of a polyolefin-based synthetic resin material in particular are inherently soft, flexible and highly gas-permeable, resulting in a particle shape that is far more deformable than starting material beads consisting of a polystyrene-based synthetic resin material having the same degree of expansion, so that the packing properties in the present invention can be improved in a particularly effective manner. In general, starting material beads of a polyolefin-based synthetic resin material has a large dispersion in the form and a poor packing properties comparing with starting material beads consisting of a polystyrene-based synthetic resin material. Accordingly, when using starting material beads of a polyolefin-based synthetic resin material, the improved packing properties of the present invention can be shown more easily.

Die-Expanded Molding Method

The following die-expanded molding method can be employed with a die-expanded molding apparatus 1 equipped with the clearance 18 described above.

This die-expanded molding method is an expanded molding method in which starting material beads 5 are packed in the cavity formed and surrounded by the aforementioned pair of molds 2 and 3, the beads are heated and expanded to form a molded product, and the molded product is cooled and released from the mold, wherein various service fluids for the supply of steam to the cavity, pressurization and depressurization, the supply of compression air, and the like are manipulated by using the inter-mold cavity 32 communicating with the cavity 4 through the clearance 18 at the seam in the outer peripheral part of the two molds 2 and 3 located at the outer peripheral distal ends 4a of the cavity 4 when the two molds are closed; that is, a method in which various service fluids are supplied and the pressure is adjusted.

In this case, the manipulation of service fluids through the clearance by the manipulation of fluids to the inter-mold cavity 32, and the manipulation of service fluids through the through-holes 15 of the molds 2 and 3 by the manipulation of service fluids to the chambers 30 and 31, can be carried out independently or in common, a matter which can be suitably selected according to the molding conditions, although the former independent manipulation is preferred because high-precision operations can be managed.

The aforementioned expanded molding method of the present invention can be put into practice as an expanded molding method containing at least one of the following operations using the aforementioned inter-mold cavity 32.

1) The packing air that is sent to deliver the starting material beads 5 from the starting material tank 24 in the starting material bead packing step is expelled through the clearance 18 formed at the seam of the molds 2 and 3. In this case, since the air is expelled from the outer peripheral distal end 4a portion of the cavity 4 in conjunction with the expulsion of air through the through-holes 15 of the two molds 2 and 3, the starting material beads 5 cross through sufficiently without the molds being cracked, and irregular packing density can be prevented. The advantage of better starting material bead 5 packing properties can also be obtained even when the expanded molded foam is a deep container or when the distal end has a complex shape.

2) Not only is air expelled in the manner described above during the process for packing the starting material beads 5, but the pressure in the cavity 4 is also adjusted through the clearance 18. That is, the back pressure is adjusted to a desired pressure relative to the pressure of the packing air for sending the starting material beads 5 from the starting material tank 24, so that the optimal packing method can be used, such as pressure packing, compression packing, and vacuum or suction packing in which the back pressure is adjusted to atmospheric pressure or lower.

3) Steam is introduced into the clearance 18 to heat the portions around the clearance and into the cavity 4 to facilitate the heating of the starting material beads 5 in the portions around the cavity 4 during the step for heating the packed starting material beads 5.

This affords the advantage of allowing a shorter molding time to be designed because the starting material beads 5 in the outer peripheral distal end 4a of the cavity 4 can be more rapidly heated, since the flanges 2a and 3a constituting the outer periphery of the two molds 2 and 3, which in the past required a relatively large volume of heat and were difficult to heat, are directly heated.

Since it is possible to ensure that the air is purged from the outer peripheral distal end 4a by steam and to independently adjust the pressure through the clearance 18, the steam pressure can be controlled to a positive or negative setting or the like relative to the chamber pressure so as to set the temperature balance in the molds 2 and 3 to optimum conditions, allowing dramatic reductions in the cycle time and energy conservation to be anticipated.

4) In addition to the injection of cooling water during the cooling step, the pressure in the cavity 4 is reduced through the clearance 18 to promote cooling by the vaporization of moisture penetrating into the cavity 4 due to water injection, as well as to expel drainage.

In this case also, the cycle time can be dramatically reduced because of the ability to promote decreases in temperatures in the flanges 2a and 3a of the molds, which require large volumes of heat and are difficult to cool.

5) Drainage which has collected in the clearance 18 and inter-mold cavity 32 is expelled during the mold release step to remove the expanded molded foam. As a result, the drainage collecting in the clearance 18 and in the inter-mold cavity 32 as a result of water injection during cooling can be eliminated, making it possible to remedy drawbacks such as wetting of the working area, even when the molds are opened to release the product.

First Alternative Embodiment of Packing Method

A first alternative embodiment of the packing method is described below.

Figure 8:
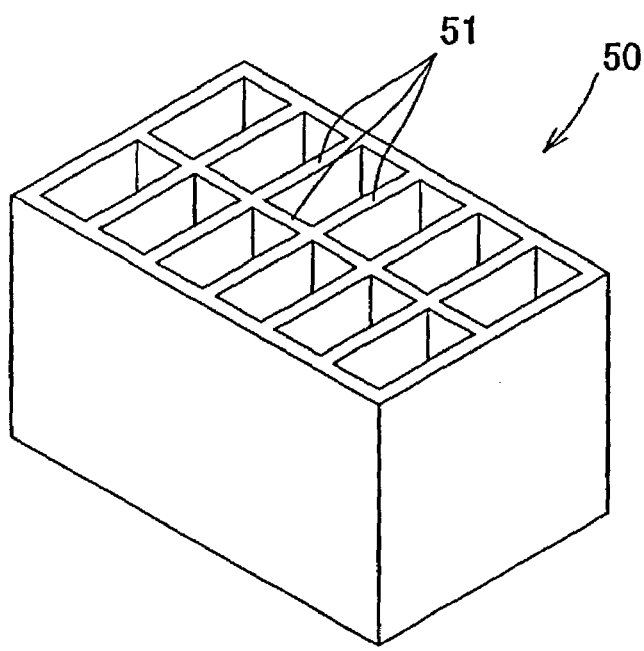
FIG. 8 is an oblique view of a molded product.
Figure 9:
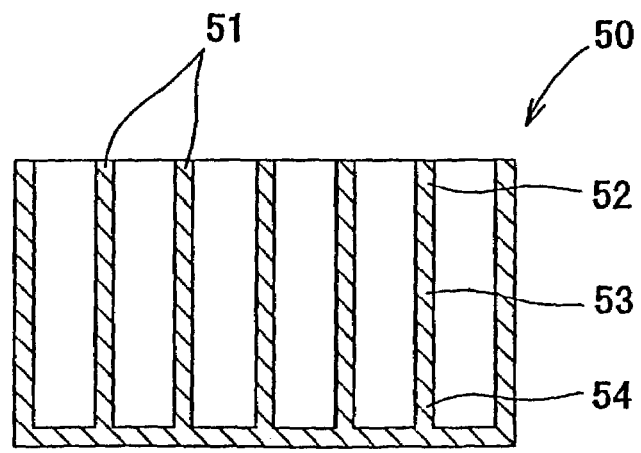
FIG. 9 is a vertical cross sectional view of a molded product.

This packing method is suitable for a die-expanded molding apparatus for molding foam 50 having a complex shape such as that shown in FIGS. 8 and 9, for example.

The die-expanded molding apparatus is described first. Since this die-expanded molding apparatus has essentially the same structure as the aforementioned die-expanded molding apparatus 1, only the differences will be described. Parts that are the same as those in the aforementioned die-expanded molding apparatus are designated by the same symbols, and therefore will not be described in detail.

Figure 6:
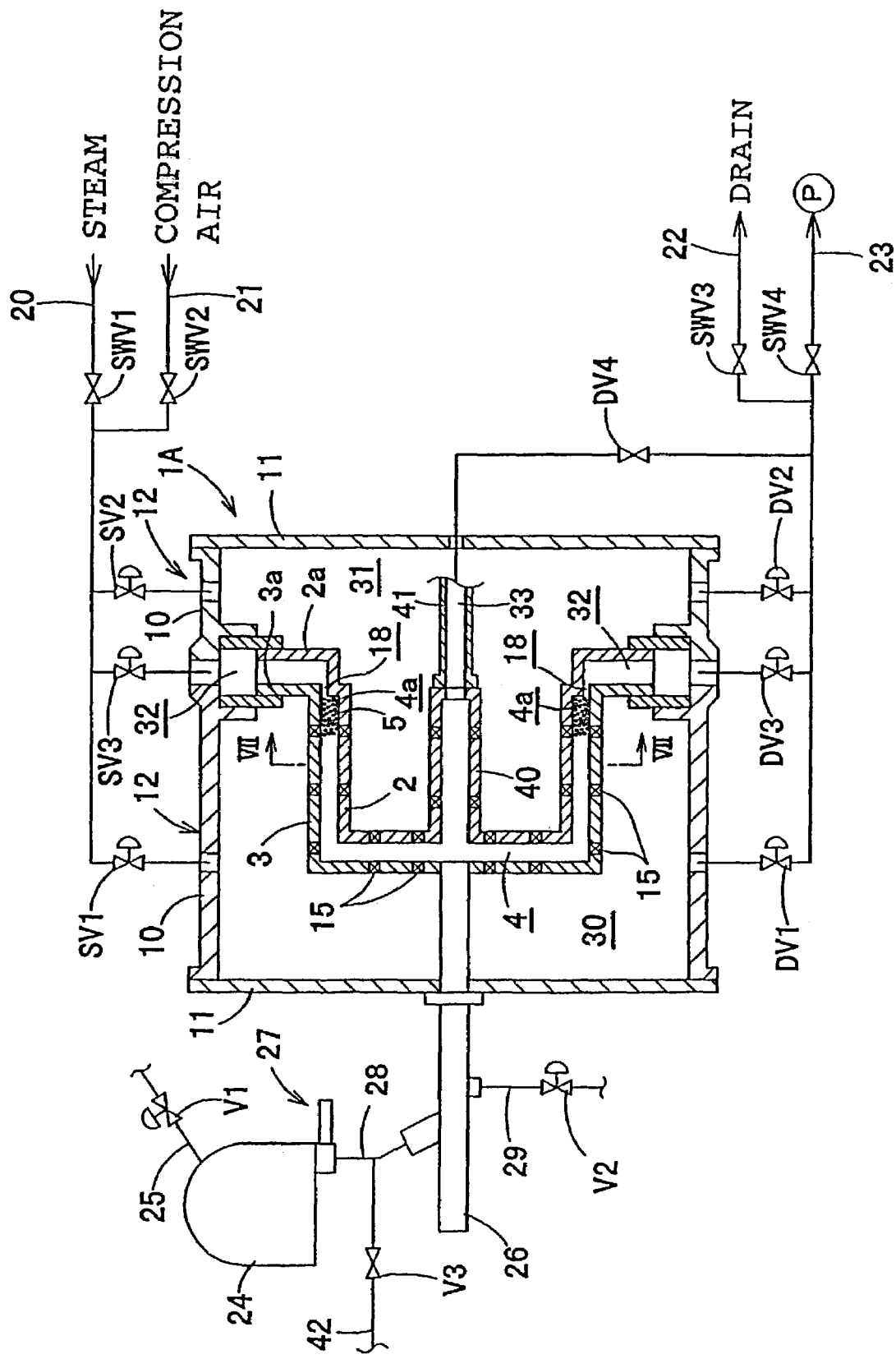
FIG. 6 is a vertical cross sectional view of the die-expanded molding apparatus used in the first packing method.
Figure 7:
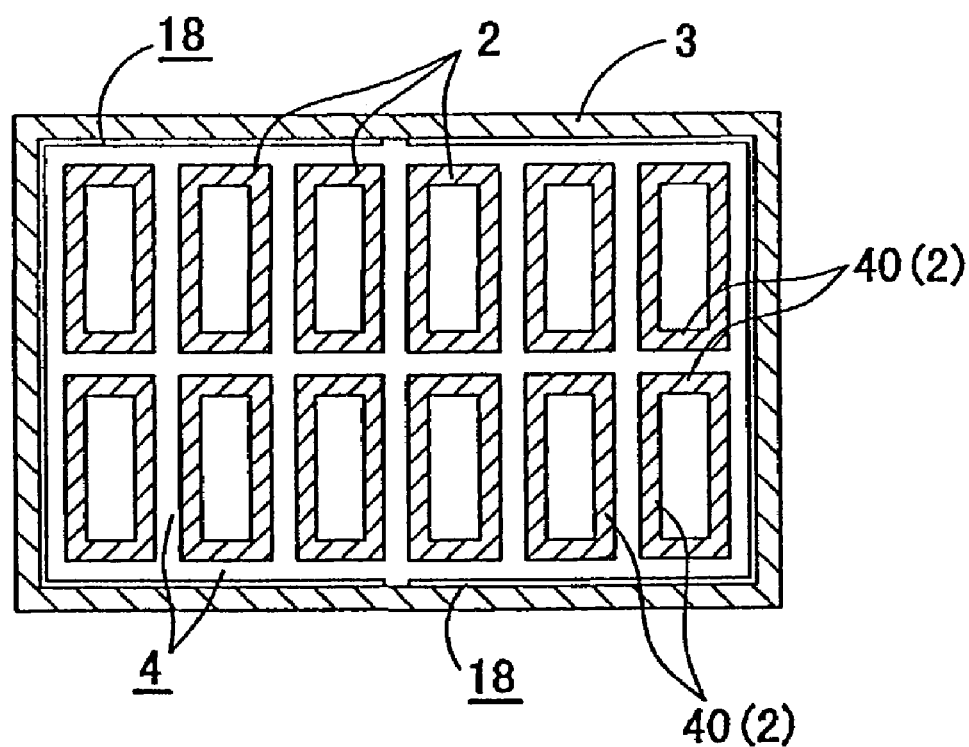
FIG. 7 is a cross sectional view of line VII—VII in FIG. 6.

As shown in FIGS. 6 and 7, narrow, bottomed components 40 that are difficult to pack have been formed in the core mold 2 of a die-expanded molding apparatus 1A, and partitioned walls 51 are formed in the molded product 50 as shown in FIGS. 8 and 9 by these difficult-to-pack components 40. A drain pipe 41 communicates with the deep ends of the difficult-to-pack components 40, and the drain pipe 41 is connected through a drain valve DV4 and switching valves SWV3 and SWV4 to a drain pipe 22 and vacuum pipe 23, respectively. The shape of these difficult-to-pack components 40 and their molding position can be set as desired according to the shape of the molded product. For example, pouch-shaped recessed components formed in a mold to make molded products with protrusions or the like, or remote components which are at a distance from the packer 26, such as around the clearance 18 shown in FIG. 6, can be handled in the same manner as the difficult-to-pack components 40, when it is difficult to pack such components with the starting material beads 5. The present invention can similarly be applied to molds which do not have components that are difficult to pack.

In this packing method, the aforementioned chambers 30 and 31, inter-mold cavity 32, and space 33 in the drain pipe 41 upstream of (on the cavity 4 side) the drain valve DV4 constitute an air pressure-adjusting component for the expulsion of, and the simultaneous adjustment of the pressure of, air supplied along with the starting material beads 5 when the starting material beads 5 are packed into the cavity 4.

A quadruple-system air expulsion means is composed of air expulsion means from the chamber 30 through the drain valve DV1 to the drain pipe 22 or vacuum pipe 23, air expulsion means from the chamber 31 through the drain valve DV2 to the drain pipe 22 or vacuum pipe 23, air expulsion means from the inter-mold cavity 32 through the drain valve DV3 to the drain pipe 22 or vacuum pipe 23, and air expulsion means from the space 33 in the pipe through the drain valve DV4 to the drain pipe 22 or vacuum pipe 23. One of either the air expulsion means with the inter-mold cavity 32 or the air expulsion means with the pipe space 33 may be omitted. At least one of chambers 30 and 31 and the inter-mold cavity 32 may be divided into a plurality of spaces to provide plural-system air expulsion means in which the plurality of spaces serve as air pressure-adjusting components. When there are several difficult-to-pack components 40, plural-system air expulsion means in which an drain pipe is connected to each of the plurality of difficult-to-pack components may furthermore be provided.

Control means not shown in the figure for independently controlling each of the aforementioned drain valves DV1 through DV4 are provided, and these drain valves DV1 through DV4 are automatically controlled by the control means when the starting material beads 5 are being packed, so that the internal pressures in the chambers 30 and 31, the inter-mold cavity 32, and the pipe space 33 are each adjusted, independently or in any combination.

An adjusting air supply pipe 42 is connected between the packing pipe 28 and the shutter 27 mounted in the starting material tank 24, and adjusting air having a suitable pressure is supplied to the packing pipe 28 by means of the adjusting air valve V3 located in the adjusting air supply pipe 42. The adjusting means is composed of this adjusting air supply pipe 42 and adjusting air valve V3, and the starting material beads 5 is supplied from the starting material tank 24 to the packing pipe 28 while diluted with the adjusting air. The amount of adjusting air supplied is varied so as to adjust the amount of starting material beads 5 supplied per unit time to the packing pipe 28, that is, the final degree of dilution described below. The starting material beads 5 can be supplied from the starting material tank 24 to the packing pipe 28 by a supply means such as a screw conveyor, in which case the adjusting air valve V3 and adjusting air supply pipe 42 can be omitted, and the rate at which the screw conveyor rotates can be varied to adjust the amount in which the starting material beads 5 are supplied per unit time to the cavity 4.

An example of a method for packing the starting material beads 5 using the aforementioned die-expanded molding apparatus 1A is described below.

First, the core mold 2 and cavity mold 3 are closed, the air in the starting material tank 24 is pre-pressurized, and the air in the chambers 30 and 31, inter-mold cavity 32, pipe space 33, and cavity 4 is pre-pressurized. The pressure in the chambers 30 and 31, inter-mold cavity 32, pipe space 33, and cavity 4 should be adjusted according to the degree of packing difficulty.

Next, the packer 26 filler, shutter, packing air valve V2, and adjusting air valve V3 are opened to begin packing the starting material beads 5. The packing air pressure in the packing air valve V2 is at least 2 kg/cm$^2$ or more higher than the internal pressure of the starting material tank 24, and is adjusted to an absolute value of 4 kg/cm$^2$ or higher.

During packing, the starting material beads 5 flow into the cavity 4 while diluted by the compressed air in the starting material tank 24, the compressed air from the adjusting air valve V3, and the compressed air from the packing air valve V2. In terms of the volumetric ratio between the air and starting material beads 5 flowing into the cavity 4 at this time, the final degree of dilution is set to 5 or more, and preferably between 10 and 50, where the final degree of dilution is defined as the numerical value obtained by dividing the volume of air supplied to the cavity 4 during packing by the volume of the starting material beads 5. When the final degree of dilution of the starting material beads 5 is greater than 50, the amount of starting material beads 5 packed per unit time decreases, resulting in the problems of a longer packing time, a longer molding cycle time, and greater air consumption. The range is preferably between 10 and 50, because when the final degree of dilution is lower than 10, there is greater contact and there are more collisions between the starting material beads 5 in the packing pipe 28, packing pipe 26, or cavity 4, resulting in the problem of increases in the resistance hampering the packing of the starting material beads 5, and the starting material beads 5 interfere with the current of air, resulting in the problem of poor packing. However, when the starting material beads 5 are supplied by a supply means such as a screw conveyor, the rotating speed of the screw conveyor is adjusted to the desired final degree of dilution, so as to establish the amount in which the starting material beads 5 are supplied per unit time to the cavity 4.

The compressed air thus flowing into the cavity increases the pressure of the chambers 30 and 31, the inter-mold cavity 32, and the pipe space 33 through the through-holes 15 and the clearance 18. At this time, the pressures in the chambers 30 and 31, the inter-mold cavity 32, and the pipe space 33 can be adjusted, individually or in any combination, by using the drain valves DV1 through DV4, so that the starting material beads 5 can be first packed into parts which are difficult to pack with starting material beads 5 in order to control irregular density in the various parts of the molded product and to ensure a suitable packing density.

For example, when the internal pressures in the chambers 30 and 31, inter-mold cavity 32, and pipe space 33 are at or beyond the set pressure, the drain valves DV1 through DV4 are successively opened, and when the set pressure is in the order chamber 30>chamber 31>inter-mold cavity 32>pipe space 33, the drain valve DV4 is opened first to allow the parts 40 that are difficult to pack to be packed with the starting material beads 5; and when the internal pressure of the chambers 30 and 31 and the inter-mold cavity 32 increases as the parts 40 that are difficult to pack are nearly completely packed with the starting material beads 5, the drain valve DV3 is opened to allow the outer periphery of the cavity 4 to be packed with the starting material beads 5. The drain valves are thus successively opened in the order of ascending set pressure to allow the cavity 4 to be packed with the starting material beads 5.

In another control method, the packing process is divided into four parts, where the cavity 4 is successively packed as the air pressure in the pipe space 33 is controlled using only the drain valve DV4 in the first step, the air pressure in the inter-mold cavity 32 and pipe space 33 using drain valves DV3 and DV4 in step 2, the air pressure in the chamber 31, inter-mold cavity 32, and pipe space 33 is controlled using drain valves DV2 through DV4, and the air pressure in chambers 30 and 31, inter-mold cavity 32, and pipe space 33 is controlled using drain valves DV2 through DV4.

After the starting material beads 5 have thus been packed, the filler of the packer 26 is closed, the adjusting air valve V3 is closed, the starting material beads 5 remaining in the packer 26 and packing pipe 28 are returned to the starting material tank 24 using filling air, the packing cycle is then completed by closing the packing air valve V2 and shutter 27, and a series of common molding steps comprising heating, cooling, and mold release is then carried out to obtain the desired molded product.

Molded products formed in this manner, which include, for example, those in which the degree of shape complexity is 1.1 or more, preferably 1.2 or more, more preferably 1.3 or more, where the degree of shape complexity is defined as the numerical value obtained by dividing the surface area of the molded product by the volume, which is measured by cm unit, those in which the wall thickness of the thin-walled portions of the molded product is 10 mm to 3 mm, preferably 8 mm to 3 mm, more preferably 6 mm to 3 mm, and those in which 3 or less beads are disposed in the thicknesswise direction of the thin-walled portions of the molded product, can have good quality with little irregularity in density, wherein the density in various parts of molded product is within ±5%, preferably within ±4%, and even more preferably within ±3%, of the mean density, even in molded products which have conventionally been regarded as being difficult to pack. The present invention is effective and useful for molded products which are larger and have more complex shapes than small molded products with simple shapes such as containers for cups of noodles. It is particularly advantageous for molded articles having both thin and thick walls.

Tests for assessing the quality of molded products formed by packing starting material beads 5 according to this packing method are described below.

Four types of molded articles 50 were manufactured by packing the starting material beads 5 by four packing methods (the starting material beads 5 were packed by cracked packing, pressure packing, and compression packing, and by the method of the present invention) as methods for packing the starting material beads 5 to manufacture a molded product 50 having the shape given in FIGS. 8 and 9. The density was measured at the tip 51, middle 52, and base 53 of the partition walls 51 of the molded product 50, as shown in FIG. 9, with the results shown in Table 1. The molded product shown in Table 1 is manufactured by using polypropylene beads having a degree of expansion of 53 times. The molded product is a box-type having an outer size of a depth of 40 cm, a width of 25 cm and a height of 14 cm. It has 5 ribs having a thickness of 0.8 cm in a longitudinal and one rib having a thickness of 0.8 cm in a transverse direction. The weight is 160 g, the degree of expansion is 45 times, and the degree of shape complexity is 2.46. The degree of shape complexity of rectangular parallelepiped having a same outer size is 0.27 and the degree of shape complexity of a box-type molded product without ribs is 1.04.

TABLE 1

| | Conventional packing methods | | | (unit: g/L) |
|---|---|---|---|---|
| Measured | cracked packing | pressure packing | compression packing | Packing |
| Tip | 15 | 16 | 17 | 21 |
| Middle | 18 | 19 | 19 | 20 |
| Base | 24 | 22 | 21 | 20 |

As shown in Table 1, the density decreased from the base 54 to the tip 52 of the partition walls 51 in the molded products produced by packing the starting material beads 5 using conventional methods, whereas the density was generally uniform in the molded products produced by packing the starting material beads 5 in accordance with the packing method of the present invention. In other words, it may be seen that molded products of good quality and little irregularity in density could be produced by the method of the present invention. It has been necessary to design conventional molded products on the basis of the parts with low density so as obtain sufficient strength in those parts with low density, resulting in the problem of heavier molded products, whereas the generally uniform density in the various parts of the molded product in the present invention allows sufficient molded strength to be ensured, lighter molded products to be created, and lower amounts of starting material beads 5 to be used, thus lowering the manufacturing costs of the molded products.

In this embodiment, the internal pressure in the chambers 30 and 31, inter-mold cavity 32, and pipe space 33 were controlled in such a way that the density in the various parts of the molded product was uniform, but it is also possible to locally increase the packing density of the starting material beads 5 in portions where greater strength is desired. The present invention can, of course, also be applied to form molded products with various shapes other than that of the molded product 50.

Second Alternative Embodiment of Packing Method

A second alternative embodiment of the packing method is described below.

Figure 10:
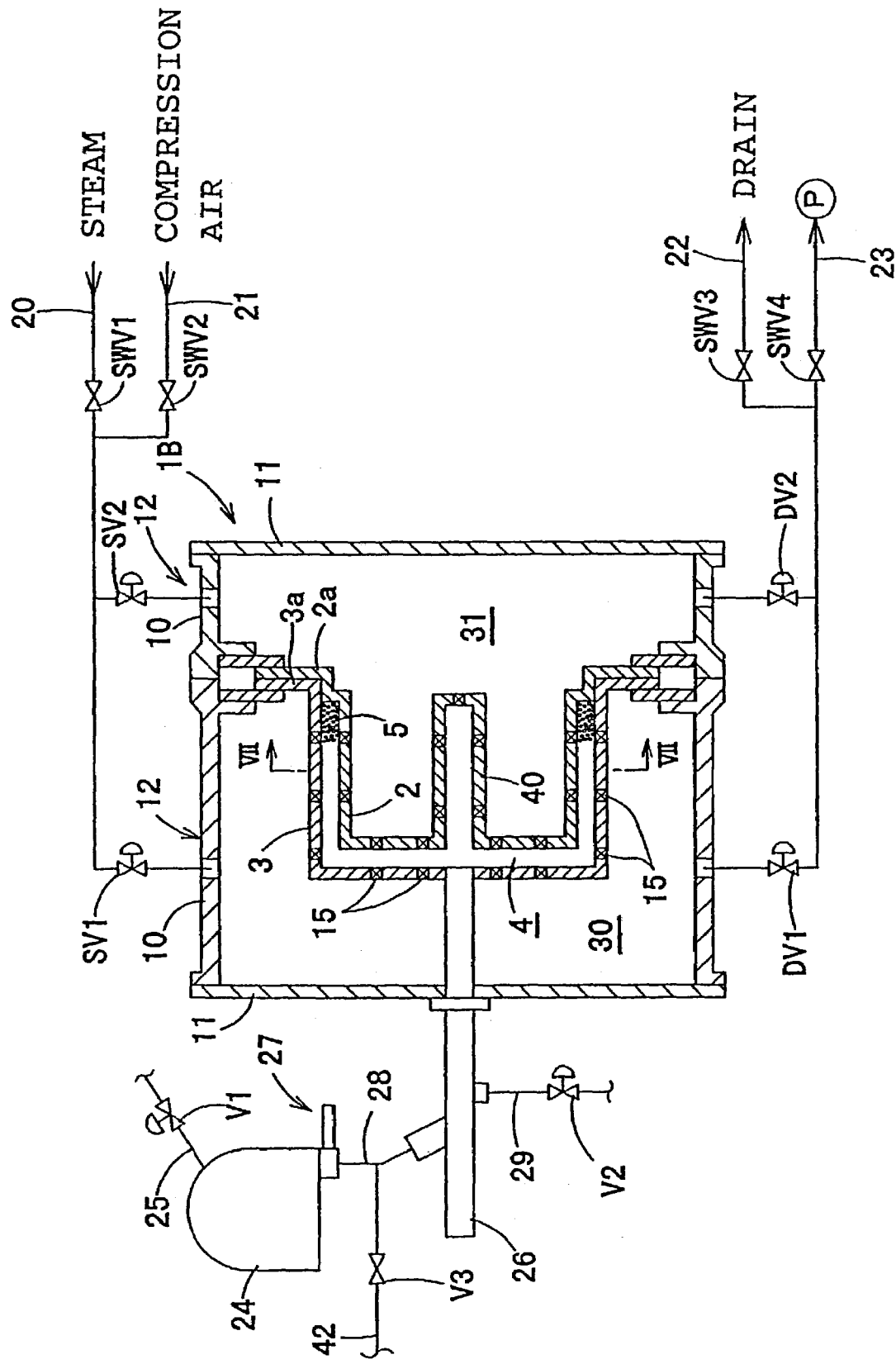
FIG. 10 is a vertical cross sectional view of the die-expanded molding apparatus used in the second packing method.

As shown in FIG. 10, the die-expanded molding apparatus 1B used in this packing method differs from the aforementioned die-expanded molding apparatus 1A in that no clearance 18 or inter-mold cavity 32 is formed between the two molds 2 and 3, the drain pipe 41 and drain valve DV4 are omitted, and the drain valve D3 and service valve SV3 are omitted. The structure is otherwise the same, and parts that are the same are therefore indicated by the same symbols and will not be discussed in detail.

Characteristic features are, first, that at least the pressure of the chamber 31 on the core mold 2 side, where the aforementioned parts 40 that are difficult to pack have been formed, is controlled so as to maintain a negative pressure relative to the atmospheric pressure of the packed starting material beads 5, and part of the predetermined packing amount for the entire cavity 4, preferably an amount corresponding to the aforementioned parts 40 that are difficult to pack, of the starting material beads 5 is delivered and packed in a concentrated manner in the aforementioned parts 40 that are difficult to pack. In this case, as shown in Table 2 below, the concentrated packing should be facilitated by the supply of air under pressure to the chamber 30 on the cavity mold 3 side.

A second feature is that the pressures in both chambers 30 and 31 are adjusted during the aforementioned concentrated packing to a negative pressure relative to the atmospheric pressure of the packed starting material beads 5, so as to deliver the rest of the predetermined packing amount of the starting material beads 5 and pack them in the entire cavity 4. In this case, the standard pressure serving as the atmosphere of the packed starting material beads 5 can be represented by the increased pressure of the starting material tank 24.

These operations are described in further detail in the steps in the following Table 2.

TABLE 2

| Step | Shutter 27 | Service valve | Drain valve | Drain valve | Packing air valve | Details |
|---|---|---|---|---|---|---|
| Packing | closed | closed | open | open | closed | Increased |
| 1st packing | open | ↑ | closed | ↑ | open | Portion |
| Concentrate | closed | open | ↑ | ↑ | ↑ | Concentrate |
| Adjusted | ↑ | closed | open | ↑ | ↑ | Packing |
| 2nd packing | open | ↑ | ↑ | ↑ | ↑ | Packing |
| 1st blow | ↑ | ↑ | ↑ | ↑ | ↑ | Natural blow |
| 2nd blow | open | ↑ | ↑ | ↑ | open | Forced blow |

Note: "closing" of drain valves DV1 and DV2 indicates an atmospheric expulsion or adjusted expulsion state.

(1) In the packing standby process, the starting material tank 24 is pressurized to about 1.2 kg/cm$^2$, for example, the two chambers 30 and 31 are adjusted to about 1.0 kg/cm$^2$, for example, and the packing operations are prepared at a pressure differential of about 0.2 kg/cm$^2$.

The pressure differential is preferably set within a range of 0.01 to 0.5 kg/cm$^2$ for the sake of the packing rate, reliability, ease of control, and the like.

(2) In the first packing process, the drain valve DV1 is closed, the shutter 27 is opened as the pressure differential between the pressure in the starting material tank 24 and the chamber 31 is maintained, starting material beads 5 are delivered, in an amount corresponding to the volume of the aforementioned parts 40 that are difficult to pack, into the cavity 4 for the next concentrated packing step.

(3) In the concentrated packing step, the supply of the starting material beads 5 is temporarily suspended, the service valve SV1 is opened, and the chamber 30 is pressurized to about 2.0 kg/cm$^2$, for example. In this case, the chamber 31 is adjusted to a pressure of about 1.8 kg/cm$^2$, for example, to maintain a pressure differential of about 0.2 kg/cm$^2$. In about four seconds, a current of air from the chamber 30 to the chamber 31 is produced by the pressure differential, so that the starting material beads 5 delivered earlier for that purpose flow into the difficult-to-pack parts 40 and are packed in a concentrated manner.

In this case, the pressure in the chambers 30 and 31 should be set higher than in the case of the earlier first packing process as noted above. At this set pressure, the starting material beads 5 are pressurized more forcefully and are compressed to a lower volume, resulting in the advantage of more efficient flow into the parts 40 that are difficult to pack.

This pressurization should increase the pressure in the starting material tank 24 to within a range of 0.01 and 5.0 kg/cm$^2$ as the aforementioned pressure differential is maintained.

(4) In the subsequent pressure adjusting step, the pressurization of chamber 30 is stopped, and the pressure in the chambers 30 and 31 and the internal pressure of the starting material tank 24 are returned to where they were in the first packing step to prepare for the second packing step which is the next full-scale operation.

In the present invention, the aforementioned first packing step, concentrated packing step, and pressure adjusting step should be repeated as often as needed when the aforementioned parts 40 that are difficult to pack are particularly deep and narrow, or when there are multiple parts 40 that are difficult to pack.

(5) In the second packing step, the pressure in the two chambers 30 and 31 is adjusted, the same pressure differential as in the first packing step earlier is maintained, and the remainder of the predetermined packing amount of starting material beads 5 is delivered and packed in the entire cavity 4.

(6) Among the next first blow back and second blow back steps, in the first blow back, referred to as natural blow back, that is carried out, the layers of packed starting material beads form a barrier and cause the packing air to flow back in the packer 26 when the starting material beads 5 are packed in the cavity 4, whereas the second blow back that is then carried out comprises forced blow back in which the inlet of the packer 26 is closed off, and all of the starting material beads 5 left in the pipes such as the packer 26 and the packing pipe 28 flows back into the starting material tank 24.

When the above starting material bead 5 packing steps are completed, the following heating step is undertaken.

In the description thus far, the parts 40 that are difficult to pack were located in the core mold 2, but a method in which the chambers 30 and 31 in the description thus far are reversed can be used to obtain exactly the same action and effects when parts 40 that are difficult to pack have been provided in the cavity mold 3.

In this packing method, the structure is the same as above, allowing parts that are difficult to pack, such as recesses having a difficult-to-pack pouch-shaped cross section, to be packed in the same manner as the other parts.

Figure 11:
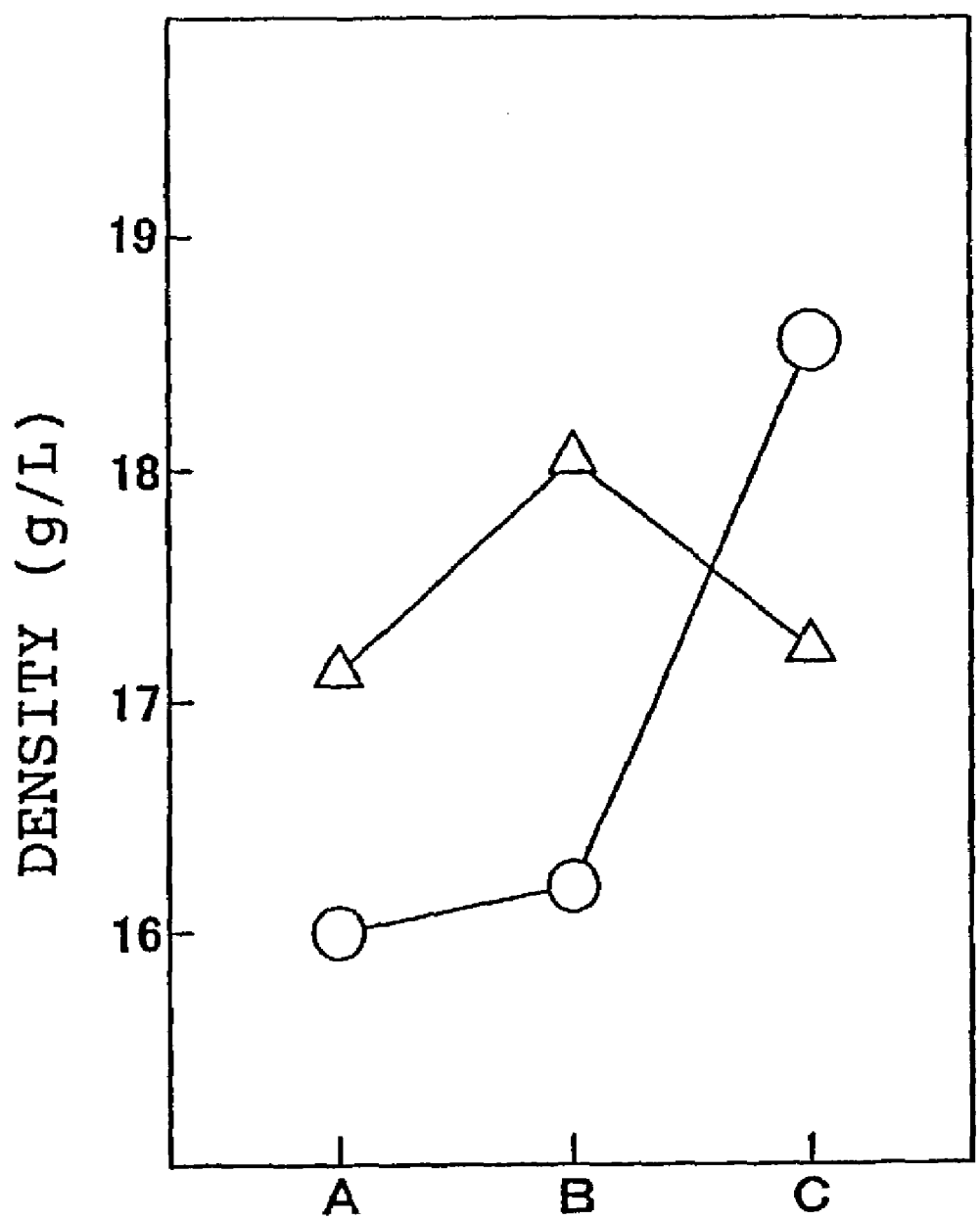
FIG. 11 is an illustration of the packing density.

FIG. 11 shows the density distribution according to location in expanded molded foam which is a box having a different shape from Table 1 and the degree of shape complexity is 2.44. Here, the horizontal axis (A) represents the convex protruding tip formed in parts that are difficult to pack, comprising the pouch-shaped recesses and edges of the peripheral wall of expanded molded foam, the axis (B) represents the wall section of the expanded molded foam, and the axis (C) represents the bottom part.

The results show that expanded molded foam obtained by a conventional method, as indicated by O, had extremely irregular density, where parts A and B had extremely low density, and part C had high density, whereas the packing method of the present invention, as indicated by Δ, reduced such irregular density by about ½. In this case, density of each part of the expanded molded foam is between 16.4 and 18.2, which is in a range of _}5% of the average density of 17.3.

The present invention also remedies irregular density caused by cracking because there is no, or minimal, cracking width during packing. There is no need for a greater number of packers, which can be kept to a minimum, allowing the amounts of service fluids such as packing air to be greatly reduced. The number of packers arranged per molded product can also be reduced to make more effective use of the entire mold surface area, resulting in advantages such as the same higher productivity that is obtained with conventional molds of simpler shape.

Blow Back Method

Another embodiment of the blow back method is described below. The blow back step is a step in which the starting material beads remaining in the packer 26 or packing pipe 28 are allowed to blow back into the starting material tank 24 after the end of the packing operations, and is managed for all types of packing methods, including cracked packing, pressure packing, and compression packing.

The structure of the starting material bead packing system is discussed first.

Figure 12:
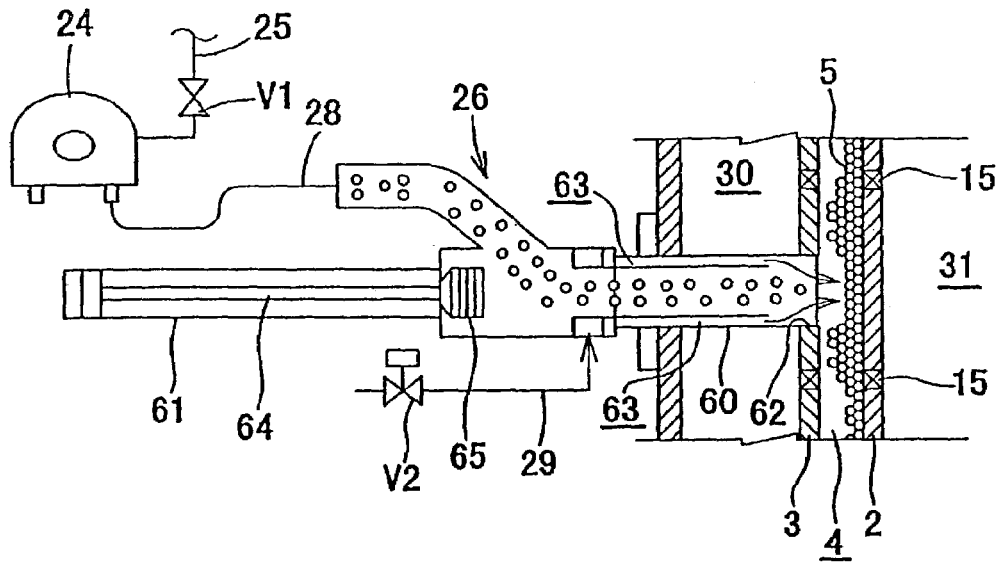
FIG. 12 is an illustration of the starting material bead packing system.
Figure 12:
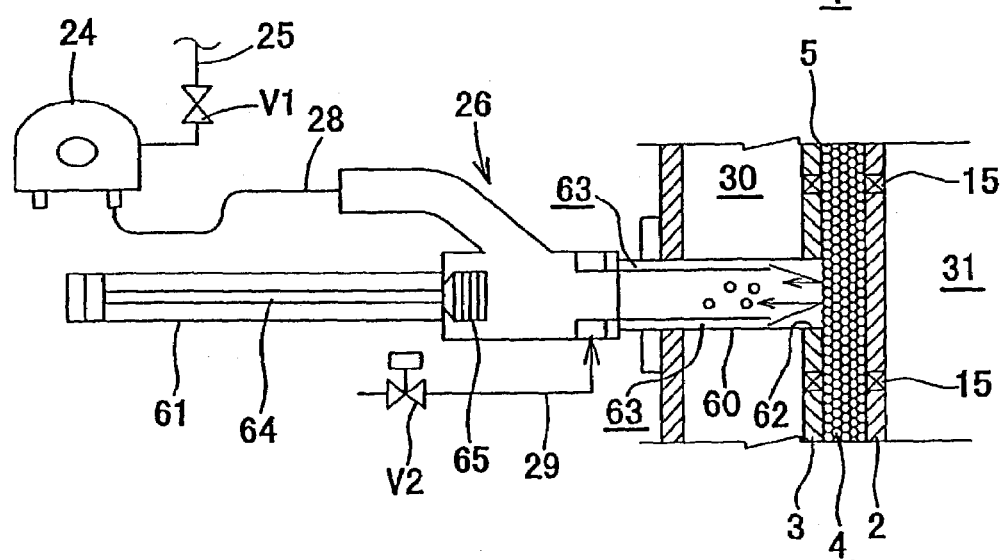
Figure 12:
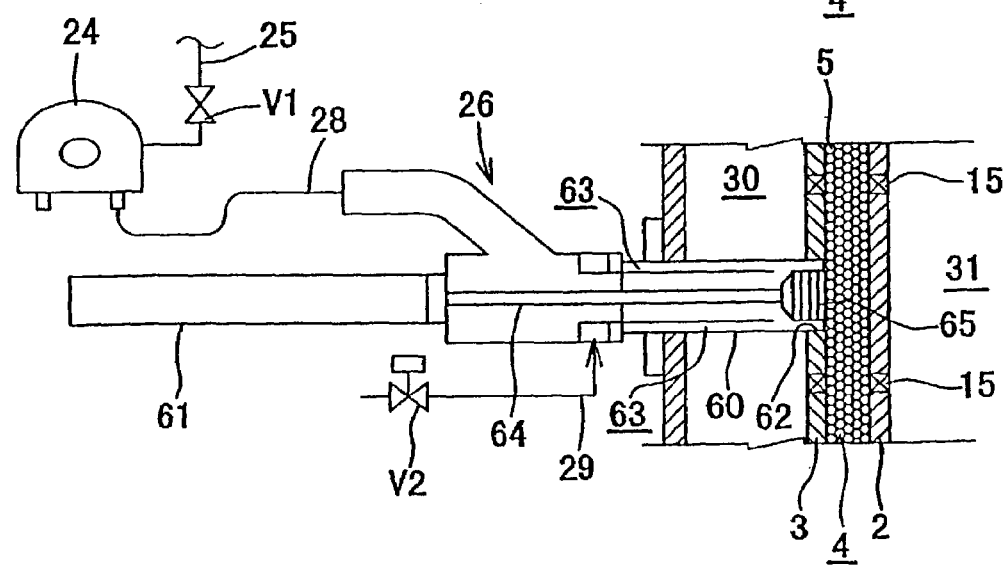
Figure 13:
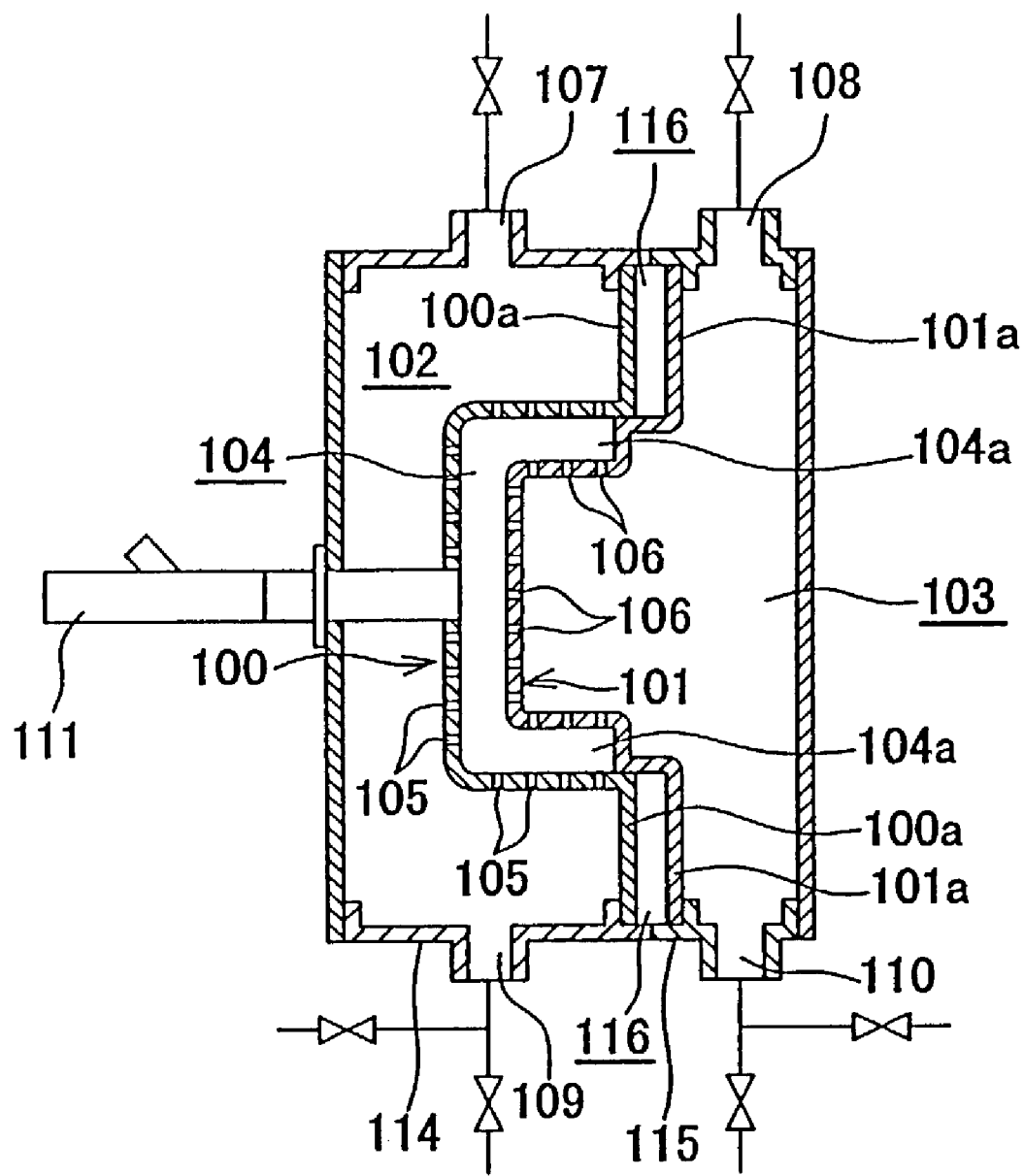
FIGS. 13 through FIG. 15 relate to the prior art, where
Figure 14:
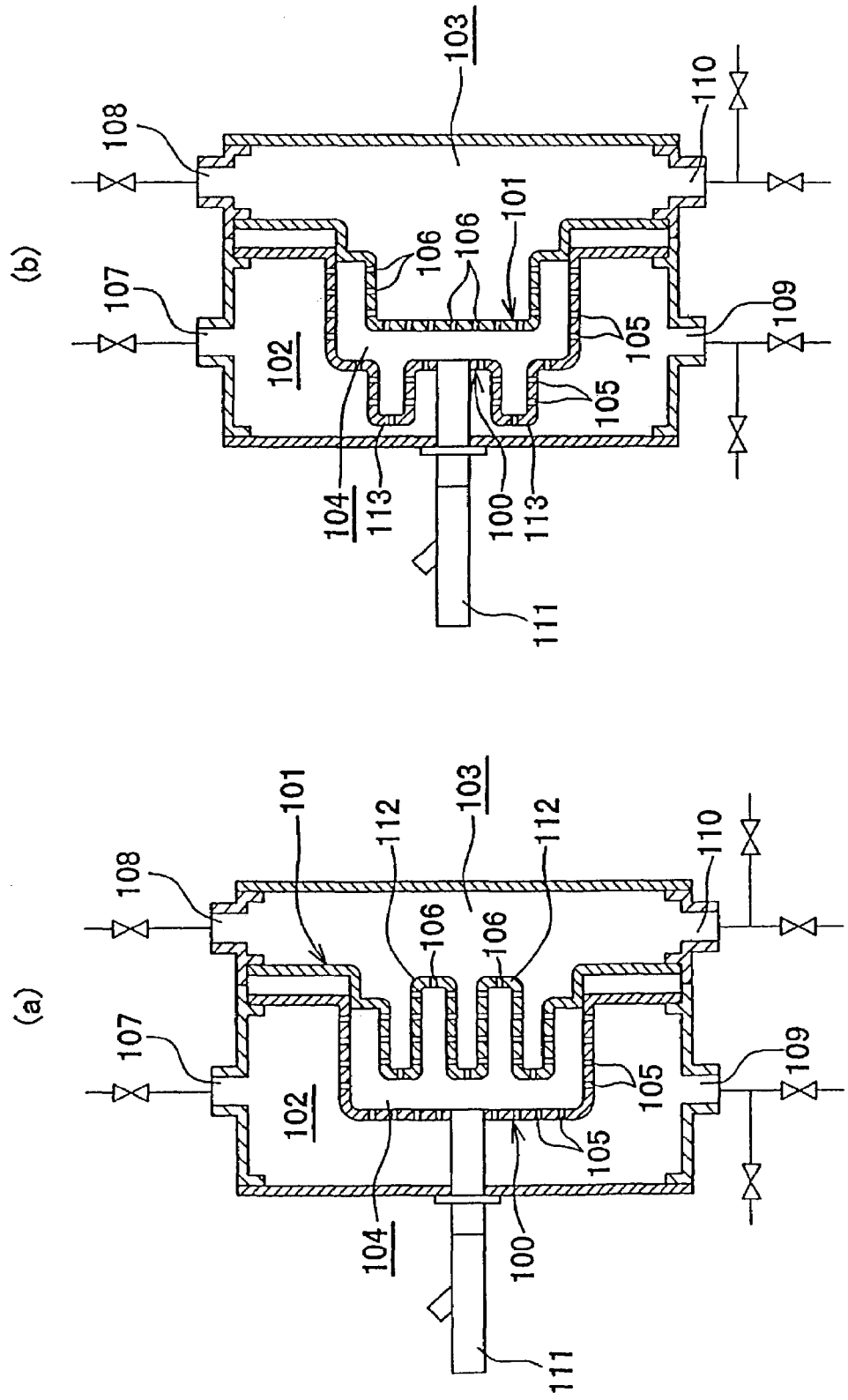
Figure 15:
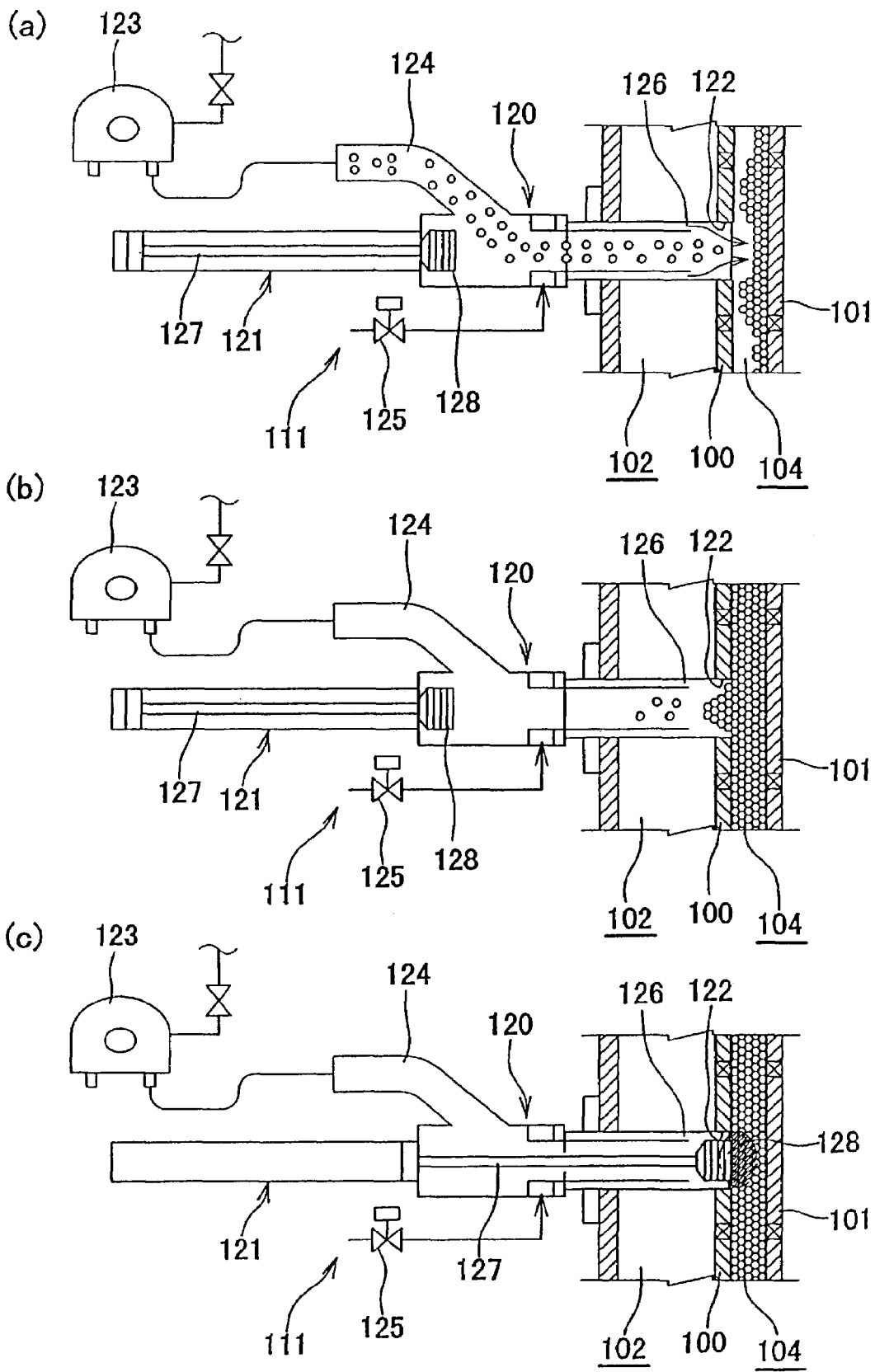

As shown in FIG. 12, the packer 26 is composed of a packing pipe 60, through which the starting material beads pass, and a flange 61. The distal end of the packing pipe 60 is connected through the chamber 30 to the through-hole 62 formed in the cavity mold 3. A packing air channel 63 opening into the supply hole 62 in the vicinity of the distal end of the packing pipe component 60 is formed along the packing pipe 60 inside the packing pipe component 60, and is connected to the packing air supply pipe 29 in the base of the packing air channel 63.

The method is the same as that described in the Related Art in that the pressure in the chambers 30 and 31 is adjusted to 0.8/cm², for example, in order to adjust the pressure in the cavity 4 to a negative pressure relative to the pressure in the starting material tank 24, that is, a pressure which has been adjusted to 1.0 kg/cm², for example, so as to deliver the starting material beads 5 into the cavity 4, and packing air with a pressure of about 6 kg/cm² is discharged through the packing air valve V2 through the packing air channel 63 from the distal end of the packing pipe component 60, as indicated by the arrows in FIG. 12(a).

A feature of the first embodiment is that natural blow back begins when the cavity 4 is filled with the starting material beads 5 thus delivered, such as the state shown in FIG. 12(b), but that blow back is carried out at this time by controlling the pressure in the chamber 30 and 31 to between 0.8 and 1.5 kg/cm², for example, so that the pressure in the cavity 4 is maintained at a positive pressure as the pressure in the starting material tank 24 is maintained, specifically, is maintained at 1.0 kg/cm².

The second embodiment is characterized in that, when natural blow black begins, blow back is carried out by controlling the pressure in the starting material tank 24 to a pressure equivalent to the pressure in the cavity 4, at 0.8 kg/cm², for example, or to a negative pressure, while maintaining the pressure in the cavity 4, in other words, maintaining the pressure at 0.8 kg/cm². In this case, the pressure in the starting material tank 24 should be adjusted to between 0.8 and 0.3 kg/cm².

The maximum pressure differential of the pressure in the starting material tank 24 relative to the pressure in the cavity 4 must be 0.5 kg/cm², as indicated in the first and second embodiments.

In this packing step, natural blow back is carried out under such pressure conditions, the plunger shaft 64 in the plunger 61 is then pushed out in the same manner as in the past, and the starting material bead supply hole 62 of the cavity 4 should be closed off by the plunger tip 65. The expanded molded foam thus obtained is not compromised by the overpacking in parts located near the packing holes 62, as happens in conventional packing methods.

This action is attributed to the following phenomenon.

When blow back is carried out as in the embodiments, the pressure in the aforementioned cavity 4 and starting material tank 24 is adjusted under the pressure conditions given in the aforementioned first and second embodiments, so that the current of air moving the starting material beads 5 from the packer 26 to the cavity 4 is weakened or stopped, and the pressure causing the starting material beads 5 around the supply holes 62 of the cavity mold 3 to adhere to the inside of the cavity 4 is also weakened, preventing the build-up of excess starting material beads 5, as shown in FIG. 12(b).

Overpacking varies, depending on the weight ratio of the starting material beads 5 and the wall thickness of the cavity 4 around the starting material supply hole 62, and the pressure differential between the pressure in the starting material tank 24 and the pressure in the cavity 4 must be suitably set according to the final product, while the use of the two natural blow back methods in the aforementioned embodiments must be suitably selected.

The maximum pressure differential is 0.5 kg/cm² because a pressure greater than 0.5 kg/cm² causes the starting material beads 5 to flow back and results in at least the partial destruction of the packed state in the cavity 4.

The start of natural blow back can be detected because the flow of the starting material beads 5 in the packing pipe 28 stops, so the pressure in the starting material tank 24 and the pressure in the cavity 4 should be adjusted in the manner described above. In the present invention, the pressure in the cavity 4 may be treated as being virtually equivalent to the pressure in the chambers 30 and 31 surrounding the cavity 4, so the pressure in the cavity 4 can be adjusted by the control of the supply and expulsion of air to and from the chambers and manipulation based on their pressures.

To adjust the pressure in the cavity 4 so as to keep the prescribed pressure differential relative to the internal pressure in the starting material tank 24, a preferred method in the present invention is to individually adjust the pressures in the chambers 30 and 31 to set the pressure differential in the cavity 4.

For example, when the pressure in the chamber 30 on the cavity mold 3 side where the packer 26 is mounted is set higher than the pressure in the chamber 31 on the other side on the core mold 2 side, the pressure around the supply hole 62 can be set to a positive pressure relative to the pressure in the starting material tank 24 during natural blow back, and the starting material beads 5 that have already been packed can be kept in a state adhering on the cavity mold 3 side, resulting in the advantage of a lower tendency for starting material bead 5 back flow.

INDUSTRIAL APPLICABILITY

1. Die-Expanded Molding Apparatus

According to the die-expanded molding apparatus relating to the present invention, the air supplied into the cavity is expelled from the cavity by air expulsion means as starting material beads are supplied on an air current into the cavity by starting material bead supply means, and the starting material beads are packed in the cavity, but since the air expulsion means comprises at least two systems, which are independently controlled, the starting material beads can be packed first in parts where the packing density tends to be lower, for example, a more uniform packing density can be set in the various parts of the molded product, the starting material beads can be packed first in parts where greater strength and rigidity are desired, and the packing density can be locally increases in such parts. The packing density can be set to optimum levels in the various parts of molded products without increasing the number of packers, even in molded products having parts where the packing density tends to be lower, such as thin-walled parts.

The provision of air expulsion means having one or a plurality of air pressure-adjusting components in communication with the clearance between the core mold and cavity mold as the air expulsion means allows the air supplied into the cavity to be expelled more efficiently to the outside from the clearance formed around the cavity. When, for example, a deep-bottomed container or the like is produced, a clearance is formed in a location corresponding to the rim of the container, allowing a suitable packing density to be maintained and the container quality to be improved without increasing the number of packers.

The provision of air expulsion means having one or a plurality of air pressure-adjusting components in communication with the interior of bottomed, narrow parts, which are difficult to pack with the starting material beads, as the air expulsion means allows molded products of good quality to be produced because the packing density of the starting material beads in parts that are difficult to pack can be maintained at suitable levels, even in molded products having a complex shape such as parts that are difficult to pack that have been regarded as being difficult to manufacture because the packing density could not be satisfactorily maintained in the past.

The provision of air expulsion means having one or a plurality of air pressure-adjusting components in communication with the interior of remote parts, which are at a distance from the starting material bead supply means, as the air expulsion means allows molded products of good quality to be produced because the packing density can be maintained at suitable levels in remote parts where the packing density of the starting material beads tends to be lower.

The provision of plural-system air expulsion means comprising air expulsion means in which the chambers on the back side of the core mold and/or the back side of the cavity mold are divided into plural parts and used as air pressure-adjusting components allows the packing density in various parts of molded products to be even more precisely controlled so as to improve the packing density in necessary parts and ensure a suitable packing density in the molded product as a whole.

The atmospheric release, pressurization, pressure reduction and/or these should be combined and the internal pressure of the air pressure-adjusting components should be controlled by the control means in such a way that the degree to which the starting material beads are packed can be set as desired in any part of the cavity.

2. First Die-Expanded Molding Method: Improved Packing Properties in Outer Periphery of Cavity In the first die-expanded molding method, packing air is expelled through the clearance when the starting material beads are being packed, so that air can be expelled from the outer peripheral distal end of the cavity as air is expelled from the core vents of the two molds, thereby allowing the starting material beads to sufficiently cross to the outer peripheral distal end of the cavity without cracking the molds, so as to prevent irregular packing density. Another advantage is that the packing properties of the starting material beads can be improved even when the expanded molded foam is a deep container or has tips with complex shapes.

The pressure in the cavity is also adjusted through the clearance when the starting material beads are being packed, and the back pressure is adjusted to the desired pressure relative to the packing air pressure for sending the starting material beads from the starting material tank, so that the optimal packing method can be used, such as pressure packing, compression packing, and vacuum or suction packing in which the back pressure is adjusted to atmospheric pressure or lower.

The provision of clearance in this manner affords the following effects in addition to those obtained during packing.

((1)) The advantage of allowing a shorter molding time can be designed because the plunger constituting the outer periphery of the two molds can be directly heated through the clearance, whereas in the past these parts required a considerable volume of heat and were difficult to heat. Since it is possible to ensure that the air is purged from the outer peripheral distal end by steam and to independently adjust the pressure through the clearance, the steam pressure can be controlled to a positive or negative setting or the like relative to the chamber pressure so as to set the temperature balance in the molds to optimum conditions, allowing dramatic reductions in the cycle time and energy conservation to be anticipated.

((2)) The cycle time can be dramatically reduced because of the ability to promote decreases in temperatures in the flanges of the molds, which require large volumes of heat and are difficult to cool, during the aforementioned cooling.

((3)) Because drainage collecting in the clearance and in the inter-mold cavity as a result of water injection during cooling can be eliminated, it is possible to remedy drawbacks such as wetting of the expanded molded foam product and wetting of the working area, even when the molds are opened to release the expanded molded foam.

3. Second Die-Expanded Molding Method: Improved Packing Properties in Parts That Are Difficult to Pack According to the second die-expanded molding method, the starting material beads can be packed in a concentrated manner in parts that are difficult to pack, making it possible to prevent local drops in the packing density of the starting material beads in parts that are difficult to pack such as pouch-shaped recesses. Particularly when the starting material beads are repeatedly delivered to parts that are difficult to pack, the starting material beads can be packed in a concentrated manner in such parts that are difficult to pack.

4. Third Die-Expanded Molding Method: Improved Packing Properties in Parts That Are Difficult to Pack According to the third die-expanded molding method, the air expulsion means having air pressure-adjusting components in communication with parts that are difficult to pack, for example, among the dual-system air expulsion means, is first controlled to first pack the starting material beads in those parts, so as to ensure that a suitable packing density is maintained in those parts.

When the air expulsion means is controlled by the aforementioned control means in such a way that the starting material beads are first packed in parts having a bottomed, narrow shape that are difficult to pack with starting material beads, it becomes possible to produce molded products of good quality because the packing density of the starting material beads in parts that are difficult to pack can be maintained at suitable levels, even in molded products having a complex shape such as parts that are difficult to pack that have been regarded as being difficult to manufacture because the packing density could not be satisfactorily maintained in the past.

When the air expulsion means is controlled by the aforementioned control means in such a way that the starting material beads are first packed in remote parts that are at a distance from the starting material bead supply means, it becomes possible to produce molded products of good quality because the packing density of the starting material beads can be maintained at suitable levels in parts that are difficult to pack.

When, as another method for improving the packing properties of the starting material beads in parts that are difficult to pack, the starting material beads are supplied on a current of packing air into the cavity while the amount of starting material beads supplied per unit time to the cavity is adjusted by the adjusting means, the starting material beads can be supplied more efficiently, even in narrow, bottomed, thin-walled parts that are difficult to pack with starting material beads or in remote parts that are at a distance from the packer.

When the starting material beads are diluted with adjusting air and are delivered into the cavity on a current of packing air as the aforementioned adjusting means, the manufacturing costs of the adjusting means can be reduced, and the starting material beads can be prevented from damage during packing.

When the final degree of dilution of the starting material beads is set to 5 or more using the aforementioned adjusting means, it becomes possible to ensure that the starting material beads have sufficient packing density in parts that are difficult to pack.

5. Blow Back: Improved Packing Properties in Locations Facing the Packer

According to the aforementioned die-expanded molding method, when the pressure in the cavity is set to a positive pressure as the pressure in the starting material tank is maintained during blow back operations immediately prior to the conclusion of the packing, or when the pressure in the starting material tank is adjusted to a pressure equivalent to or lower than the pressure in the cavity as the pressure in the starting material tank is maintained, a current of air from the cavity to the starting material tank is produced, making it possible to prevent defects in the return flow of the starting material beads caused by the adhesion of surplus starting material beads on the cavity side in the packer as well as local increases in the packing density caused by defects in the return flow.

The starting material supply hole is closed off by the plunger after natural blow back, and subsequent forced blow back makes it possible to ensure that the starting material beads in the packer flow back into the starting material tank.

6. Die-Expanded Molded Foam

According to the die-expanded molded foam in the present invention, the density in various parts of the molded foam is adjusted to within ±5% of the mean density, making it possible to ensure suitable strength and rigidity in thin-walled parts and the like while creating molded products of lighter weight.

Molded articles having thin-walled parts or complex shapes, that include those in which the degree of shape complexity is 1.1 or more, where the degree of shape complexity is defined as the numerical value obtained by dividing the surface area of the molded product by the volume, which is measured by cm unit, those in which the wall thickness of the thin-walled portions of the molded product is 10 mm to 3 mm, and those in which 3 or less beads are disposed in the thicknesswise direction of the thin-walled portions of the molded product, have been considered difficult to form in the past, but they can be produced by the methods described above so as to ensure adequate strength and rigidity by setting the density in various parts of the molded product to within ±5% relative to the mean density.

What is claimed is:

1. A die-expanded molding method for synthetic resins in which starting material beads are packed into a cavity formed by a core mold and cavity mold, the material is heated, expanded, and fused to form a molded product, and the molded product is cooled and released from the mold, said die-expanded molding method for synthetic resins comprising the manipulation of various service fluids for the supply of steam to the cavity, pressurization and depressurization, and the supply of compression air, by using an inter-mold clearance, formed in such a way as to communicate with external service piping, at the seam of said core mold and cavity mold located at the circumference of the cavity when the two molds are closed.

2. A die-expanded molding method as set forth in claim 1, said die-expanded molding method for synthetic resins comprising at least one of the following operations using said clearance:

1) expelling the packing air through said clearance when the starting material beads are being packed;
2) adjusting the pressure in the cavity through said clearance when the starting material beads are being packed;
3) introducing steam into said clearance to heat the portions around the clearance and into said cavity to facilitate the heating of the starting material beads in the portions around the cavity when the packed starting material beads are being heated;
4) reducing the pressure in the cavity through said clearance to promote cooling by the vaporization of moisture during said cooling; and
5) expelling drainage from said clearance during mold release operations to remove the expanded molded foam.

3. A die-expanded molding method for synthetic resins in which starting material beads are packed into a cavity formed by a core mold and cavity mold, the material is heated, expanded, and fused to form a molded product, and the molded product is cooled and released from the mold, wherein at least a chamber on the back side of a mold side, where narrow, bottomed portions that are difficult to pack with the starting material beads are formed, is held at a negative pressure relative to the atmospheric pressure of the starting material beads packed into the cavity by a packer; and part of the predetermined packing amount of the starting material beads is delivered and packed in a concentrated manner in said difficult-to-pack portions, then the internal pressure of a pair of chambers on the back side of both molds is respectively held at a negative pressure relative to the atmospheric pressure of the starting material beads, and the remainder of the predetermined packing amount is delivered to pack all of the starting material beads in the cavity.

4. A die-expanded molding method for synthetic resins as set forth in claim 3, wherein said difficult-to-pack portions are pouch-shaped recesses formed in at least one of the core mold or cavity mold.

5. A die-expanded molding method for synthetic resins as set forth in claim 3 or 4, wherein the operations of delivering the starting material beads for packing the starting material beads in a concentrated manner in said difficult-to-pack portions are carried out a plurality of times.

6. A die-expanded molding method for synthetic resins as set forth in any one of claims 1 through 4, wherein the pressure in the cavity is set to a negative pressure relative to the internal pressure of the starting material tank holding the starting material beads, so as to allow the starting material beads from the starting material tank to be packed into the cavity when the starting material beads are being packed, and the pressure in said cavity is adjusted to a positive pressure as the pressure in the starting material tank is maintained during blow back operations immediately priorto the conclusion of the packing.

7. A die-expanded molding method for synthetic resins as set forth in any of claims 1 through 4, wherein the pressure in the cavity is set to a negative pressure relative to the internal pressure of the starting material tank holding the starting material beads, so as to allow the starting material beads from the starting material tank to be packed into the cavity when the starting material beads are being packed, and the pressure in said starting material tank is adjusted to a pressure equivalent to or lower than the pressure in the cavity as the pressure in the starting material tank is maintained during blow back operations immediately prior to the conclusion of the packing.

8. A die-expanded molding method for synthetic resins, comprising the execution of natural blow back at an adjusted pressure as set forth in claim 6 during blow back operations immediately prior to the conclusion of the packing, the subsequent closing of starting material supply holes by a plunger, and the subsequent execution of forced blow back.

9. A die-expanded molding method for synthetic resins in which a die-expanded molding apparatus for synthetic resins is used to pack starting material beads in a cavity formed by a core mold and a cavity mold, the material is heated, expanded, and fused to form a molded product, and the molded product is cooled and released from the mold, said die-expanded molding method for synthetic resins comprising:

supplying starting material beads consisting of a thermoplastic synthetic resin on a current of air from a starting material tank through a packer into the cavity formed by the core mold and cavity mold by starting material bead supply means when the starting material beads are packed into the cavity; and packing the starting material beads while controlling the current of air in the cavity by adjusting the air pressure, independently or in any combination, in a plural-system air expulsion means by automatic control by control means.

10. A die-expanded molding method for synthetic resins as set forth in claim 9, wherein the air expulsion means is controlled by said control means so that the starting material beads are packed first in the narrow, bottomed portions where the starting material beads are difficult to pack.

11. A die-expanded molding method for synthetic resins as set forth in claim 10, wherein the air expulsion means is controlled by said control means so that the starting material beads are packed first in remote portions at a distance from the starting material bead supply means.

12. A die-expanded molding method for synthetic resins as set forth in claim 9, wherein the starting material beads are packed into the cavity as the amount of starting material beads being supplied to said cavity per unit time is adjusted by adjusting means.

13. A die-expanded molding method for synthetic resins as set forth in claim 12, wherein the amount of starting material beads per unit time on the current of air for packing the cavity is adjusted by said adjusting means by diluting the starting material beads with adjusting air.

14. A die-expanded molding method for synthetic resins as set forth in claim 12, wherein the final degree of dilution is defined as the numerical value obtained by dividing the volume of air supplied to the cavity during packing by the volume of the starting material beads, and the final degree of dilution is 5 or more.

15. A die-expanded molding method for synthetic resins in which starting material beads are packed into a cavity formed by a core mold and cavity mold, the material is heated, expanded, and fused to form a molded product, and the molded product is cooled and released from the mold, said die-expanded molding method for synthetic resins comprising:

the first packing process wherein at least a chamber on the back side of a mold side, where narrow, bottomed portions that are difficult to pack with the starting material beads are formed, is held at a negative pressure relative to the atmospheric pressure of the starting material beads packed into the cavity by a packer, and part of the predetermined packing amount of the starting material beads is delivered;

the concentrated packing step wherein the supply of the starting material beads is temporarily suspended, and a chamber on the back side of a mold side, where portions that are difficult to pack with the starting material beads are not formed, is pressurized so that the starting material beads are packed in a concentrated manner in the difficult-to-pack portions;

the pressure adjusting step wherein the atmospheric pressure of the starting material beads and the internal pressure of both chambers are adjusted to the same pressure setting as that of the first packing process; and the second packing step wherein the remainder of the predetermined packing amount is delivered to pack all of the starting material beads in the cavity.

16. A die-expanded molding method for synthetic resins as set forth in claim 15, wherein said difficult-to-pack portions are pouch-shaped recesses formed in at least one of the core mold or cavity mold.

17. A die-expanded molding method for synthetic resins as set forth in claim 15 or 16, wherein said first packing processes, the concentrated packing steps, and the pressure adjusting steps are carried out a plurality of times.

* * * * *